US007356628B2

(12) United States Patent
Swartzentruber

(10) Patent No.: US 7,356,628 B2
(45) Date of Patent: Apr. 8, 2008

(54) PACKET SWITCH WITH MULTIPLE ADDRESSABLE COMPONENTS

(75) Inventor: Ron L. Swartzentruber, Amesbury, MA (US)

(73) Assignee: Freescale Semiconductor, Inc., Austin, TX (US)

(*) Notice: Subject to any disclaimer, the term of this patent is extended or adjusted under 35 U.S.C. 154(b) by 83 days.

(21) Appl. No.: 11/129,600

(22) Filed: May 13, 2005

(65) Prior Publication Data
US 2006/0259671 A1 Nov. 16, 2006

(51) Int. Cl.
G06F 13/00 (2006.01)
G06F 13/36 (2006.01)

(52) U.S. Cl. ............ 710/104; 710/316; 709/238; 370/392

(58) Field of Classification Search ............... 710/8, 710/305, 306, 314, 316, 317; 709/245, 227; 714/1; 711/203; 702/182; 370/389, 341, 370/390, 244, 352, 392, 223, 331, 475; 340/2.28
See application file for complete search history.

(56) References Cited

U.S. PATENT DOCUMENTS

| | | | | |
|---|---|---|---|---|
| 6,181,679 B1* | 1/2001 | Ashton et al. | | 370/244 |
| 6,208,647 B1* | 3/2001 | Deng et al. | | 370/390 |
| 6,272,582 B1* | 8/2001 | Streitenberger et al. | | 710/314 |
| 6,496,505 B2* | 12/2002 | La Porta et al. | | 370/392 |
| 6,662,257 B1* | 12/2003 | Caruk et al. | | 710/305 |
| 6,823,386 B1* | 11/2004 | Crump et al. | | 709/227 |
| 6,823,418 B2* | 11/2004 | Langendorf et al. | | 710/306 |
| 6,922,749 B1* | 7/2005 | Gil et al. | | 710/316 |
| 6,928,529 B2* | 8/2005 | Shinomiya | | 711/203 |
| 6,946,948 B2* | 9/2005 | McCormack et al. | | 340/2.28 |
| 6,947,398 B1* | 9/2005 | Ahmed et al. | | 370/331 |
| 7,023,829 B1* | 4/2006 | Holmquist et al. | | 370/341 |
| 7,035,286 B2* | 4/2006 | Tzeng | | 370/475 |
| 7,039,749 B2* | 5/2006 | Harris et al. | | 710/316 |
| 7,043,569 B1* | 5/2006 | Chou et al. | | 710/8 |
| 7,065,040 B2* | 6/2006 | Nagamine | | 370/223 |
| 7,139,840 B1* | 11/2006 | O'Toole | | 709/245 |
| 2003/0154341 A1* | 8/2003 | Asaro et al. | | 710/306 |
| 2004/0059957 A1* | 3/2004 | Menasce et al. | | 714/1 |
| 2004/0064290 A1* | 4/2004 | Cabral et al. | | 702/182 |
| 2005/0135337 A1* | 6/2005 | Nabeta et al. | | 370/352 |
| 2006/0146812 A1* | 7/2006 | Farr et al. | | 370/389 |
| 2006/0174052 A1* | 8/2006 | Kondo et al. | | 710/317 |

* cited by examiner

Primary Examiner—Christopher E. Lee
(74) Attorney, Agent, or Firm—Gordon E. Nelson

(57) ABSTRACT

An integrated circuit on which are implemented a number of devices that conform to the Rapidio network architecture. Included in the integrated circuit are two addressed RapidIO devices and switching devices which provide 24 switching ports. The devices have a packet receiving side and a packet transmitting side; the packet receiving side of each of the devices is connected by 128-bit wide paths termed poles its own packet transmitting side and each of the other transmitting sides. Features of the integrated circuit include centralized multicasting and configuration control for all of the devices on the integrated circuit, provisions for having more than one address in a RapidIO device, techniques for defining the address space routed by a routing table, techniques for managing congestion, and advanced buffer management techniques.

19 Claims, 15 Drawing Sheets

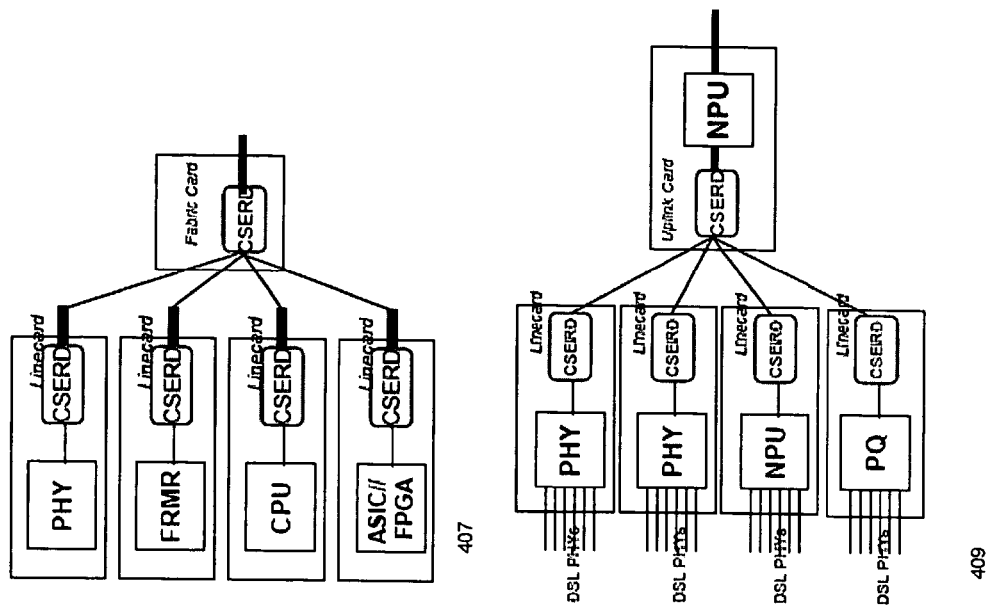
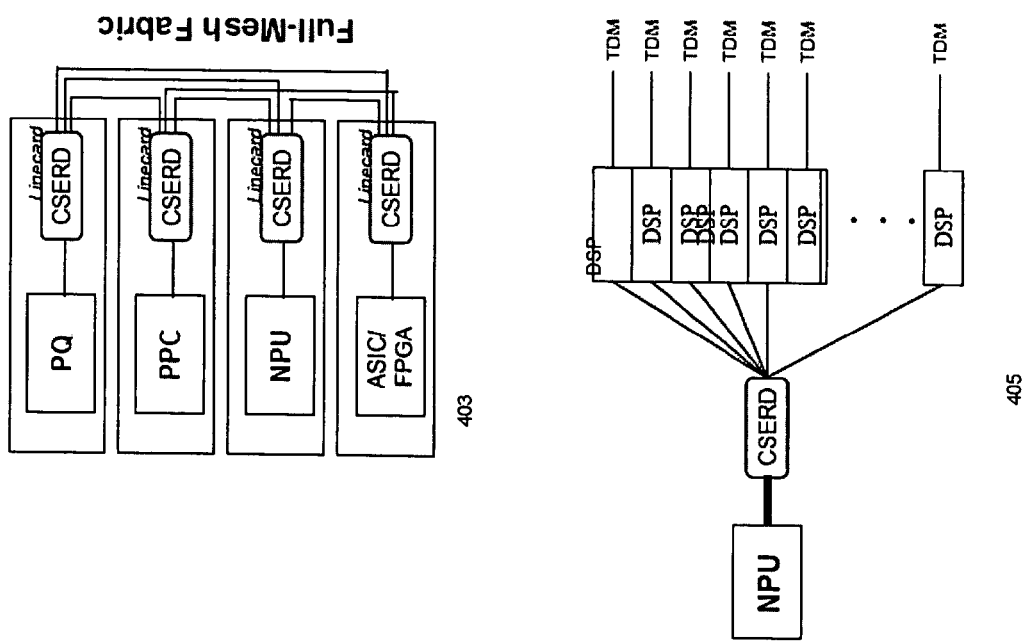
Fig. 4

| Type of Traffic | CSERD Interface used |
|---|---|
| Data Plane | CSIX, Utopia, GMII/MII, SPI-3 |
| Control Plane or Second Data Plane | GMII, MII |
| Boot PROM Device Configuration | $I^2C$ |
| Device Configuration and Statistics Gathering | $I^2C$, uP |
| Remote CSERD Configuration and Statistics Gathering | $I^2C$, uP |
| RapidIO Network Discovery | $I^2C$, uP |

601

| Endpoints A and B | | |
|---|---|---|
| Packet Format Type | Transaction Type | Description |
| 0 | Implementation defined | Reformatted DATA STREAMING packet with the PDU length in the Start segment |
| 7 | FLOW CONTROL | Receive a congestion avoidance packet |
| 8 | MAINTENANCE | Read or write a endpoint CAR or CSR register |
| 9 | DATA STREAMING | Typical data plane traffic or flow control packets |
| 11 | MESSAGE PASSING | Encapsulated data payload for communications to a control processor supporting serial RapidIO |
| 13 | RESPONSE | Logical handshake to ensure reliable transfer |

|   |
|---|
| Processing Element Features CAR 1405 |
| Switch Port Information CAR 1407 |
| Base Device ID CSR 1408 |
| device CARs and CSRs 1403 |
| non-switch CARS and CSRs 1409 |
| port CARs and CSRs 1411 |

1401

| Bit | Field Name | Description |
|---|---|---|
| 0 | Bridge | PE can bridge to another interface. Examples are PCI, proprietary processor buses, DRAM, etc. |
| 1 | Memory | PE has physically addressable local address space and can be accessed as an end point through non-maintenance (i.e. non-coherent read and write) operations. This local address space may be limited to local configuration registers, or could be on-chip SRAM, etc. |
| 2 | Processor | PE physically contains a local processor or similar device that executes code. A device that bridges to an interface that connects to a processor does not count (see bit 0 above). |
| 3 | Switch | PE can bridge to another external RapidIO interface - an internal port to a local end point does not count as a switch port. For example, a device with two RapidIO ports and a local end point is a two port switch, not a three port switch, regardless of the internal architecture. |
| 4–27 | — | Reserved |
| 28 | Extended features | PE has extended features list; the extended features pointer is valid |
| 29-31 | Extended addressing support | Indicates the number address bits supported by the PE both as a source and target of an operation. All PEs shall at minimum support 34 bit addresses.<br>0b111 - PE supports 66, 50, and 34 bit addresses<br>0b101 - PE supports 66 and 34 bit addresses<br>0b011 - PE supports 50 and 34 bit addresses<br>0b001 - PE supports 34 bit addresses<br>All other encodings reserved |

PACKET SWITCH WITH MULTIPLE ADDRESSABLE COMPONENTS

CROSS REFERENCES TO RELATED APPLICATIONS

This application shares portions of its Detailed Description with two other patent applications that have a common assignee and are being filed on even date with the present patent application. The applications are docket freesc01.003, Swartzentruber and Wilcox, Packet switch having a crossbar switch that connects multiport receiving and transmitting elements, and docket freesc01.004, Swartzentruber and Wilcox, Efficient multi-bank buffer management scheme for non-aligned data. The new disclosure in the present patent application begins in the section titled Details of configuration interface 515.

BACKGROUND OF THE INVENTION

1. Field of the Invention

The invention relates generally to packet switches implemented in integrated circuits and more particularly to packet switches that include devices that conform to the RapidIO architecture.

2. Description of Related Technology

Problems in Interconnecting the Subsystems of a Digital System

As the circuits that make up digital devices have gotten smaller and smaller, more and more subsystems have been included in the case that contains the processor. For example, thirty years ago, the case of a minicomputer contained only the processor and the memory. Hard drives and communications gear were separate. The case of a modern laptop PC has perhaps a tenth of the volume of the minicomputer case, but the case typically contains the processor, the memory, a hard drive, a removable drive, a keyboard, a screen, a microphone, a speaker, and various communications systems, including a wireless communications system.

As the number of subsystems in the case has grown, the difficulties of communication between the subsystems have increased. Originally, communication was by means of a single bus that connected the processor and all the peripherals. Driven by the different performance requirements of the peripherals, the single bus quickly became a hierarchy of buses. Subsystems are placed at the appropriate level in the hierarchy according to the performance level they require. Low performance subsystems are placed on lower performance buses, which are bridged to the higher performance buses so as to not burden the higher performance subsystems. Bridging may also be used to deal with legacy interfaces.

The need for higher levels of bus performance is driven by two key factors. First, the need for higher raw data bandwidth to support higher peripheral device performance requirements, second the need for more system concurrency. The overall system bandwidth requirements have also increased because of the increasing use of DMA, smart processor-based peripherals and multiprocessing in systems.

Over the past several years the shared multi-drop bus has been exploited to its full potential. Many techniques have been applied, such as increasing frequency, widening the interface, pipelining transactions, splitting transactions, and allowing out of order completion. Continuing to work with a bus in this manner creates several design issues. Increasing bus width, for example, reduces the maximum achievable frequency due to skew between signals. More signals will also result in more pins on a device, traces on boards and larger connectors, resulting in a higher product cost and a reduction in the number of interfaces a system or device can provide. Worsening the situation is the desire to increase the number of subsystems that can communicate directly with each other. As frequency and width increase, the ability to have more than a few subsystems attached to a shared bus becomes a difficult design challenge. In many cases, system designers have inserted a hierarchy of bridges to reduce the number of loads on a single bus.

Using a High-Speed Switch to Connect Subsystems

A fundamental solution to the problem of using buses to connect subsystems of a digital system is to replace the bus with a very high speed switch. Subsystems of the digital system are connected to the switch and communicate by sending each other packets of information. Each packet contains a destination address, and the switch routes each packet to the destination subsystem. Advantages of using a very high speed switch instead of a bus include the following:

Communication between subsystems is point-to-point. A given subsystem need only deal with packets that have the subsystem as their destination.

Many subsystems can communicate concurrently.

If packets are sent serially, a given subsystem need only have a single bidirectional connection or two unidirectional connections to the switch, greatly reducing the pin count required for the subsystems.

A standard architecture for interconnecting subsystems with switches is RapidIO™, which is described in overview in the white paper, RapidIO: *The Interconnect Architecture for High Performance Embedded Systems*, copyrighted in 2003 and available at http://www.rapidio.org/zdata/techwhitepaper_rev3.pdf in 2005. There are two broad classes of devices in the RapidIO architecture: endpoints and switches. Endpoints have addresses in a RapidIO network and source and sink transactions to and from a RapidIO network. Switches are responsible for routing packets across the RapidIO network from the source to the destination using the information in the packet header without modifying the logical layer or transport layer contents of the packet. Switches do not have addresses in the RapidIO network. Switches also determine the topology of the RapidIO network and play an important role in the overall performance of RapidIO. Some RapidIO devices can act both as endpoints and switches. Both switches and endpoints support maintenance transactions which give users of the network access to architectural registers in the devices.

FIG. 1 shows a RapidIO network 101 and an example RapidIO packet 115. RapidIO network 101 includes two four-port RapidIO switch devices 113(0 and 1) and 6 RapidIO endpoint devices 107(0 . . . 5). Endpoints 107(0,2, and 4) are connected to switch 113(0), while endpoints 107(1,3, and 5) are connected to switch 113(1). Endpoint 107(3) is further connected to ROM 111 in subsystem 109 and endpoint 107(0) is a part of a CPU 103 which has access to DRAM memory 105. An example of what can be done in network 101 is the following: CPU endpoint 107(0) can make a RapidIO packet whose destination is endpoint 107 (3) and which specifies that endpoint 107(3) is to read data from a location in ROM 111 and return the data to endpoint 107(0). When endpoint 107(0) places the packet on a connection to port 2 of switch 113(0), switch 113(0) routes the packet to switch 113(1), which then routes it to endpoint 107(3). Endpoint 107(3) then does the read operation and makes a return packet, which it outputs to switch 113(1), which in turn routes the packet to switch 113(0), which then routes it to endpoint 107(0). At that point, the CPU reads the data from the packet and stores it in DRAM 105.

The RapidIO architecture has a layered architecture with three layers:
- A logical layer that supports a variety of programming models, enabling an implementation to choose a model that is suitable for the implementation;
- A transport layer that supports both large and small networks, allowing implementations to have a flexible topology; and
- A physical layer that supports latency-tolerant backplane applications and latency-sensitive memory applications.

Components of the packets belong to each of these layers.

A typical RapidIO packet is shown at 115. Certain fields are context dependent and may not appear in all packets. The request packet begins with physical layer fields 119. Included in these fields is an "S" bit that indicates whether this is a packet or control symbol. An "AckID" indicates an ID to be used when the packet is acknowledged with a control symbol. The "PRIO" field indicates the packet priority used for flow control. The "TT" field 121, "Target Address" field 125, and "Source Address" field 127 indicate the type of transport level address mechanism being used, the address of the endpoint device the packet is to be delivered to, and the end point device from which the packet originated. The "Ftype" field 123 and the "Transaction" field 129 indicate the kind of transaction that the destination endpoint is to perform in response to the packet. "Size" field 131 is an encoded transaction size. Data payloads 137 in RapidIO packets are optional and range from 1 byte to 256 bytes in size. "srcTID" field 133 contains a transaction ID that the source endpoint has given the transaction. RapidIO devices may have up to 256 outstanding transactions between two endpoints. For memory mapped transactions, the "Device Offset Address" 135 follows. Data payload field 137 is followed by a 16-bit CRC. Then comes the next packet 141.

In terms of the layers, physical fields 119 and CRC field 16 belong to the physical layer: TT field 121, target address field 125, and source address field 127 belong to the transport layer; the remaining fields belong to the logical layer. RapidIO packets are classified by the values of Ftype field 123 and Transaction field 129 according to the kind of transaction they belong to. The kinds of transactions include:
- transactions involving coherent access to globally-shared memory;
- transactions involving non-coherent reads and writes;
- messaging transactions;
- system support transactions;
- flow control transactions; and
- user defined transactions.

For the present discussion, system support transactions are of particular importance.

Basic Approaches to the Design of Switches: FIG. 2

In the digital age, two basic approaches are used in the design of switches: crossbars and shared memory. FIG. 2 gives an example of each. At 201 is shown a switch architecture 201 that employs a crossbar switch. Data comes into the switch via a port 204. The incoming data is stored in a buffer 202 belonging to the port; data that is leaving the switch via the port exits at 204. Data that comes in at one port can be made to leave via another port by using crossbar switch 204 to connect the input port's buffer to the output port. The data is then output to the output port. The advantages of a crossbar switch are the following: once the connection is made between two ports, the switch has the bandwidth of the input and output media connected to the ports, and once the connection is made, it takes no significant time for the data to pass through the switch. The disadvantages are that large amounts of memory are required for the buffers, the routing for the crossbar switch is complex, and the number of connections required is enormous. A 24-port crossbar switch requires 552 connections and 35,328 conductors. Because of the complex routing and the large number of connections and conductors, an implementation of the switch made in an integrated circuit requires a large die area.

At 207 is shown an implementation of a switch made using shared memory. All of the ports 209 share access to shared memory 211. Because the memory is shared, arbiter 217 must determine which of the ports gets access to shared memory at any particular time. Shared memory 211 contains two kinds of information: the packets 213 being switched by the switch and a descriptor table which contains descriptors that describe the location and size of each of the packets stored in packet memory 213. The descriptors are organized into queues belonging to the ports. When a packet comes in at a port 209, the port stores the packet in packet memory 213, makes a descriptor for the packet, and places the descriptor on the queue of the port by which the packet is to leave the switch. When a port's queue contains descriptors, the port outputs descriptors until the queue is empty. The bandwidth and latency of switch 207 are determined by how long it takes to store a packet into shared memory, make and place the descriptor in the proper queue in descriptor table 215, and read the packet from shared memory 211. As long as a port has descriptors on its descriptor queue, the port can output packets. The routing for switch 207 is far less complex than that for switch 201; however, a shared memory 211 must be large and the operation of making a descriptor and placing it on the proper queue is too complex to be easily done in simple hardware.

It is an object of the invention to provide a new switch architecture for switches implemented in integrated circuits that overcomes the disadvantages of the switch architectures of FIG. 2 and thereby provide improved switches for use in interconnecting subsystems of a digital system. It is a further object of the invention to provide a device for the RapidIO and similar architectures that is implemented as an integrated circuit, and includes both an endpoint and one or more switches. Other objects and advantages will be apparent to those skilled in the arts to which the invention pertains upon perusal of the following Detailed Description and drawing, wherein:

BRIEF DESCRIPTION OF THE DRAWING

FIG. 4 presents block diagrams for a number of applications of CSERDs;

FIG. 6 is tables showing traffic types and RapidIO packet types;

FIG. 14 provides an overview of the CARs and CSRs provided by the RapidIO architecture.

Figure 1:
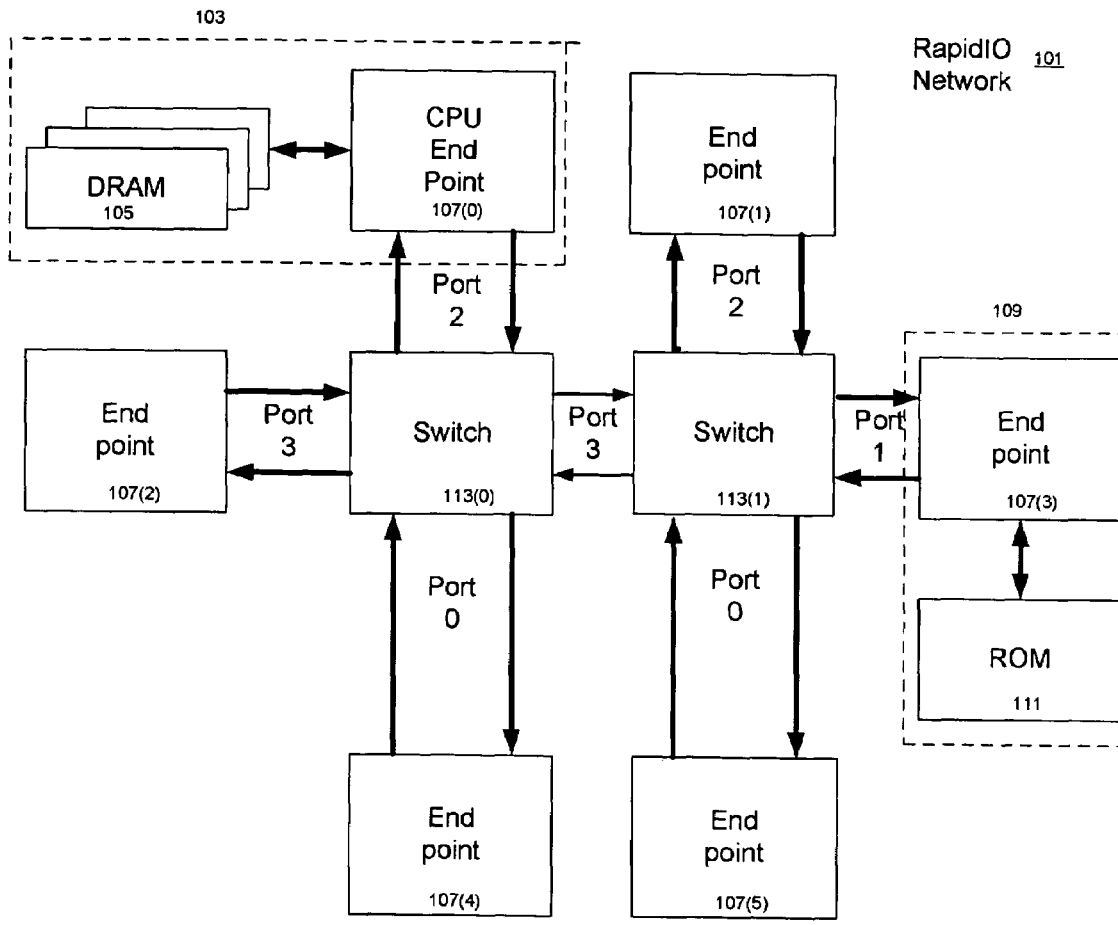
FIG. 1 shows a RapidIO network and a RapidIO packet.
Figure 2:
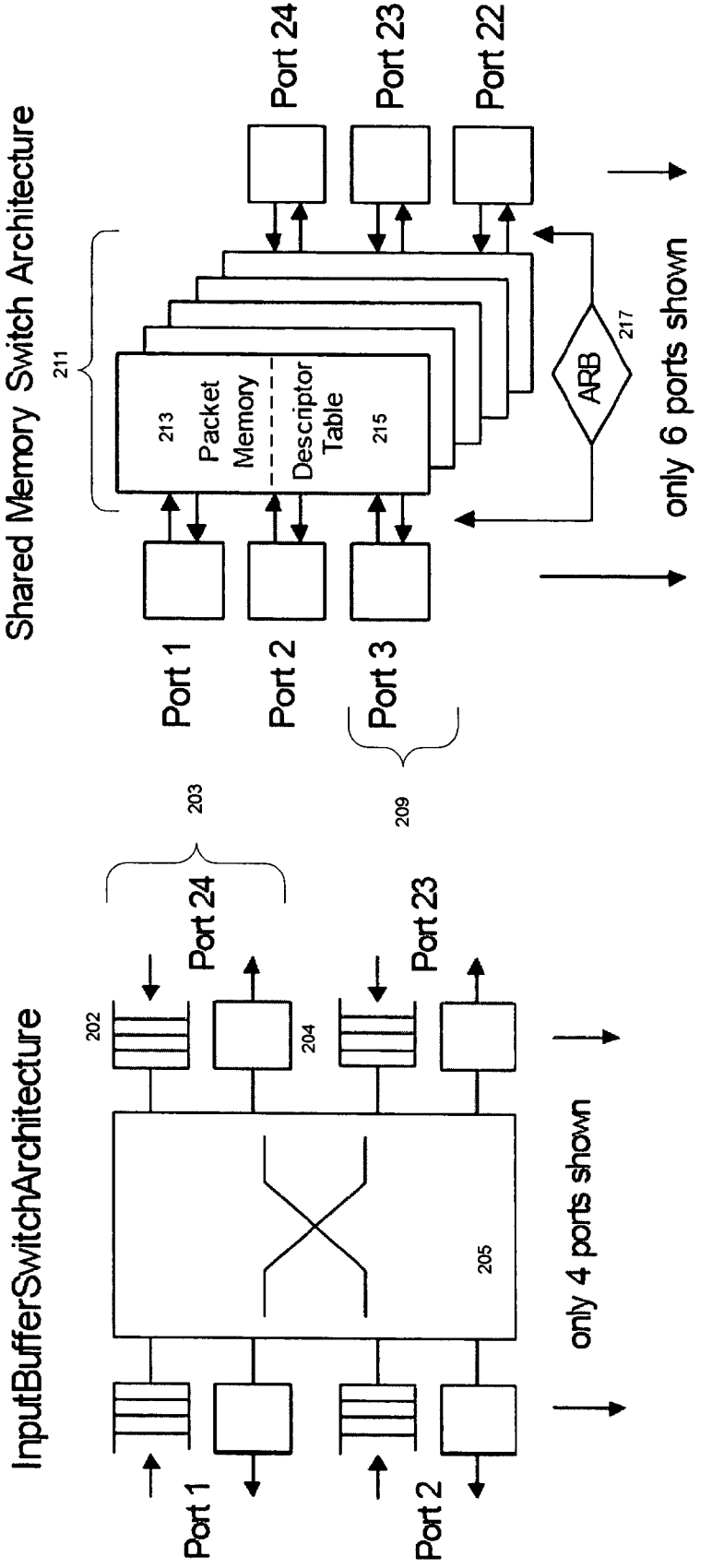
FIG. 2 shows two prior-art architectures for switches implemented in integrated circuits.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with an overview of an integrated circuit for a new type of RapidIO device which includes both endpoint and switching devices. In the following, this device will be termed a combined switch and endpoint RapidIO device, or CSERD. Features that are of particular interest in the CSERD are:

- a new switching architecture which has the advantages of the crossbar architecture but is much simpler and consequently requires less die space and is easy to implement;
- the congestion control techniques used in the architecture;
- the multicasting techniques used in the architecture; and
- a technique used to reduce the size of the routing tables used in the architecture.

The overview will be followed by detailed descriptions of components of the CSERD that are particularly relevant to these features.

Overview of the CSERD

Figure 3:
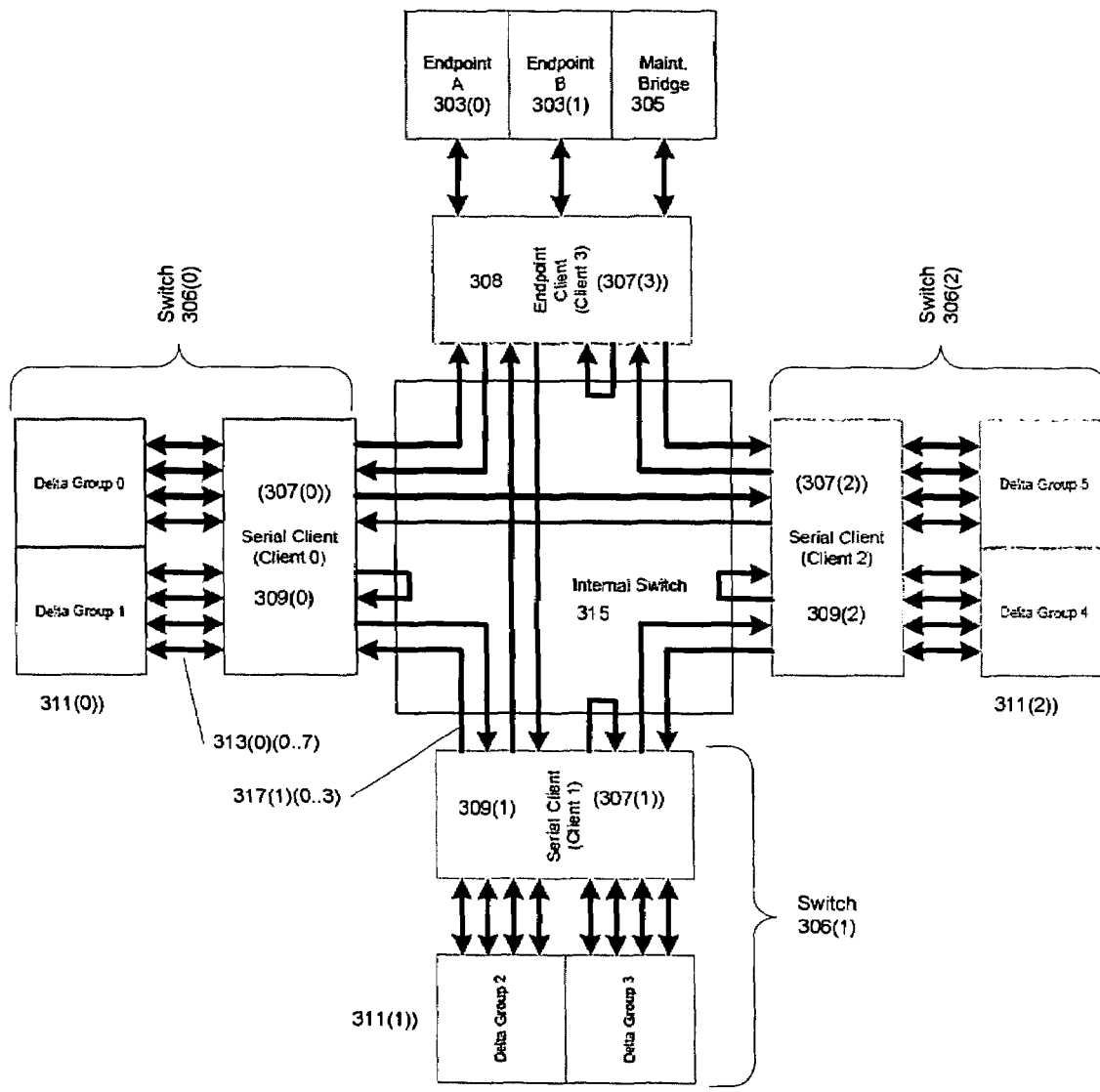
FIG. 3 is an overview of a RapidIO switch that includes an endpoint client and three switch clients.

Overview Block Diagram: FIG. 3

FIG. 3 is a high-level functional block diagram of CSERD 301. Seen as a RapidIO device, CSERD 301 has five component devices: two endpoints 303(a and b) and three switches 306(0 . . . 2). Also included is a maintenance bridge 305, which handles RapidIO maintenance packets for the RapidIO devices in CSERD 301. RapidIO packets are communicated between the devices making up CSERD 301 by internal switch 315. Each of the RapidIO devices includes a client 307 which interfaces with internal switch 315. Each client 307 has direct connections 317(i)(0 . . . 3) via internal switch 315 to itself and each of the other clients 307. Internal switch 315 thus functions as a crossbar switch connecting the clients 307. In a preferred embodiment, each direct connection is 128 bits wide. In the following, a direct connection 317(i) is termed a pole.

From the point of view of switch 315, all clients 307 are the same; there are however, two types of client: serial clients 309, which are components of switches 306, and endpoint clients 308, which are components of endpoints. In the following discussion, when a client is being referred to without regard to its type, the reference number 307 will be used; otherwise the reference number for the client's type will be used. In CSERD 301, each switch 306(i) has its own serial client 309(i) and endpoint client 308 is shared between endpoints 303(0 and 1). In addition to a serial client 309(i), a switch 306(i) has two delta groups 311(i) which provide connections to the physical media from which switch 306(i) receives RapidIO packets and to which switch 306(i) provides RapidIO packets. These connections to the physical media are termed in the following ports. In a preferred embodiment of CSERD 301, each switch 306(i) has 8 bidirectional ports 313(0 . . . 7) that are implemented by a pair of delta groups 311(i). For routing purposes, the ports may be treated as individual ports or banks of four ports, one bank belonging to each delta group.

Operation of CSERD 301 is as follows: RapidIO packets 115 may either be produced by an endpoint 303(i) or received in a port 313(i)(j) belonging to a switch 306(i). In either case, the packet 115 includes a target address 125 that specifies a RapidIO endpoint. Each client 307(i) includes a routing table (not shown) that indicates which client 307(0 . . . 3) is the destination for that target address and which port in the device that the client belongs to will take the packet 115 to its destination. If the target address is that of an endpoint 303(i) in CSERD 301, the destination client is endpoint client 308; otherwise, it is the serial client 309(i) to which the media that will take the packet to its destination is connected. In the following, the destination client will be termed the far end client. When the packet comes into a client 307(i), the client employs the lookup table to determine the far end client 307(0 . . . 3) to which the packet is to be routed and the port in the client. The packet is then placed on pole 317(i)(j) to far end client 307(j), which outputs it to the specified port 313. The information that passes via pole 317(i)(j) are the packet and signals that indicate the start and end of packet transmission and the destination port.

Of course, many variations on the architecture shown in FIG. 3 are possible. There may be more or fewer of the RapidIO switch and endpoint devices in the integrated circuit and the switches may have more or fewer media connected to them. One particularly useful variation is a CSERD with two RapidIO endpoint devices and a single RapidIO switch device with two ports. In this device, there is a single endpoint client 308 and a single serial client 309 and internal switch 315 includes only connections of each endpoint to itself and to the other endpoint.

Architectural Characteristics of CSERD 301

From an architectural point of view, CSERD 301 may be broadly characterized as packet switching apparatus which includes a plurality of devices. Each device has a receiving part which receives packets from a number of sources and an outputting part which outputs packets to a number of destinations. The destinations are specified by destination specifiers in the packets. The receiving part of each device is connected to the outputting parts of each device including itself by output data paths. There is routing apparatus in each of the receiving parts which responds to the destination specifier by routing the packet from the receiving part via the output path which connects the receiving part to the outputting part which outputs packets to the specified destination.

CSERD 301 may also be characterized from an architectural point of view as apparatus which implements a plurality of packet network devices in an integrated circuit. The packet network devices are defined by an architecture for a patent network that has addressable and non-addressable devices. The apparatus includes an addressable device in the integrated circuit which is a destination for packets defined by the architecture and a non-addressable device in the integrated circuit which routes packets to their destinations.

The non-addressable device is coupled to the addressable device and responds to a packet whose destination is the addressable device by routing the packet to the addressable device and responding to a packet whose destination is not the addressable device by routing the packet as required by the destination.

CSERD 301 may further be seen from an architectural point of view as apparatus which implements a plurality of packet network devices in an integrated circuit. The integrated circuit includes the plurality of packet network devices and a device manager for the plurality of packet network devices which performs functions for each of the packet network devices as required by that packet network device. The functions include configuring individual ones of the packet network devices and when the packet network devices include devices having input ports for receiving packets and output ports for providing packets, the functions include a multicast function that receives multicast packets from any of the plurality of input ports, makes copies of the multicast packets, and provides the copies to ports of the plurality of output ports.

Overview of Applications: FIG. 4

FIG. 4 shows block diagrams 401 of a number of applications of the 24-port CSERD 301 of FIG. 3, termed in the following CSERD-24 and the two-port CSERD just described, termed in the following CSERD-2. Shown at 403 is how CSERD-24s may be used to create a full-mesh fabric in which every subsystem of the system of 403 is connected to every other subsystem by a dedicated point-to-point serial connection. Shown at 405 is a 1×N fabric in which a network processing unit uses a CSERD-24 to aggregate data received from the a "farm" of digital signal processors. At 407 is shown an N×N fabric made with a fabric card containing a CSERD-24 and linecards containing CSERD-2s. In this network, RapidIO packets move from any linecard to any other linecard via the CSERD-24 located on the fabric card. At 409 is shown another version of a 1×N fabric in which DSL inputs are aggregated to a high-speed network. Each DSL linecard has a CSERD-2 and the uplink card has a CSERD-24. If a second uplink card is added to fabric 409 and the second port of each CSERD-2 is coupled to a port of the CSERD-24 belonging to the second uplink card, fabric 409 provides redundancy with regard to the uplink for the line cards. If one of the uplinks or the network it is connected to fails, the other can immediately take over. The same technique can be used in any case where there is a central resource that is shared by many other components.

Figure 5:
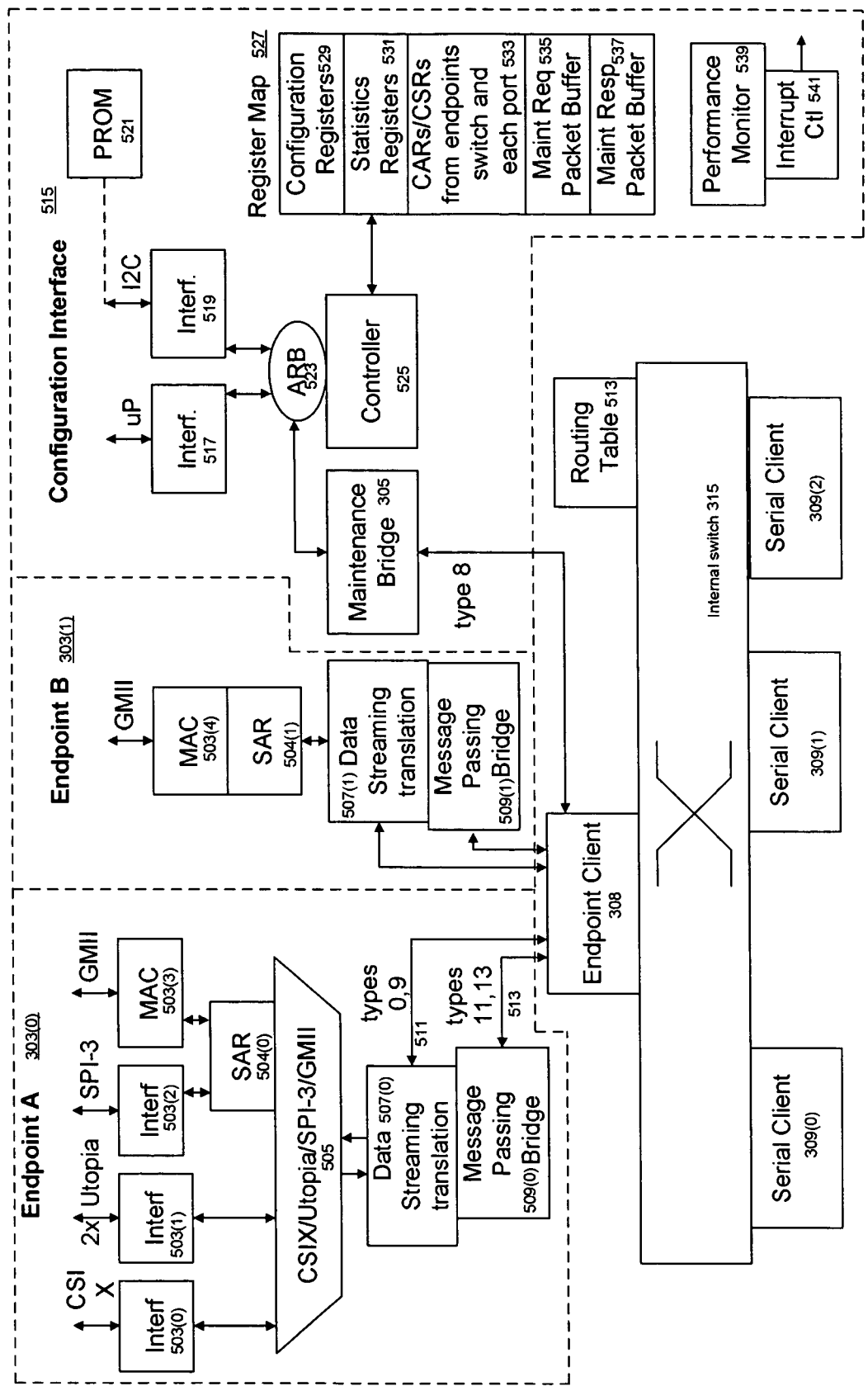
FIG. 5 is a detailed block diagram of the endpoints and configuration interfaces for a CSERD 301.

Details of the Endpoints and the Configuration Interface: FIG. 5

Details of the endpoints 303(0) and (1) and of the configuration interface to which maintenance bridge 305 belongs are shown in block diagram 501 of FIG. 5. Elements of FIG. 5 which appeared in FIG. 3 have the reference numbers they were given in FIG. 3.

The Endpoints

Seen at the highest level, CSERD 301 has endpoint interfaces that define a data plane and a control plane for the network defined by the RapidIO devices. The data plane is the network seen as a mechanism for moving streaming data from one endpoint of the network to another endpoint of the network. The control plane is the network seen as a mechanism for controlling the movement of the streaming data. The distinction between the data plane and the control plane is reflected in the interfaces by means of which the endpoints output data received in the end point from the RapidIO network and receive data to be sent over the RapidIO network and in the kinds of RapidIO packets. The interfaces are listed in table 601. The relationship between the data plane and the control plane and the RapidIO packet types is shown in table 603.

Endpoint A 303(0) can be used as a data plane interface to the switching fabric to which serial clients 309(0 . . . 2) belong. Endpoint B 303(1) can be used as either a control plane interface or as a second data plane interface to the switching fabric. Configuration interface 515 can be used for local configuration, network discovery, and statistics gathering. Like the other interfaces, it is connected via the endpoint client to the serial clients and thereby to the RapidIO network. Configuration interface 515 can thus respond to control plane data from CSERD 301 or other devices on the RapidIO network and can provide such data to CSERD 301 or the other devices.

Continuing in more detail, Endpoint A 303(0) supports input of data to CSERD 301 and output of data from CSERD 301 in modes that are compliant with the CSIX-L1, UL-2, UL-3, SPI-3 and GMII data plane interface standards. Endpoint A 303 provides a connection between the selected interface and the devices of CSERD 301. It performs MPHY, class or priority ordering of traffic that is sent from the fabric to the endpoint. It translates between ATM cells, CFrames, SPI packets, and Ethernet frames and RapidIO packets. It also provides the segmentation required to transfer large PDU's across the RapidIO network. Message Passing Bridge 509(0) allows for the conversion of data plane RapidIO packets of types 0 and 9 to packets of types 11 and 13, which are used for control plane traffic and with RapidIO endpoints that cannot handle packets of types 0 and 9. At 511 and 513 are indicated the RapidIO packet types that are handled by endpoint A 303. Endpoint B 303(1) provides a connection to a host processor or other Ethernet device for bridging to the RapidIO fabric. This port uses the GMII or MII physical interface for Gigabit Ethernet or Fast Ethernet connectivity. This interface can also be used as a second data plane interface to the fabric. It handles the same packet types as endpoint A and does the same conversions in message passing bridge 509(1).

The basic structure of endpoints 303(0) and (1) is the same: they have a message passing bridge 509 which handles RapidIO packets of types 11 and 13, a data streaming translation unit 507 which translates between RapidIO packets and the packets used in the streaming data interfaces served by the endpoints, and the interfaces 503 to the media for the streaming data interfaces. In the case of endpoint A, there is a memory buffer 505 which permits data from different ones of the interfaces 503 to be passed to translator 507 and vice-versa. Both endpoint A and endpoint B have segmentation and reassembly block 504. The block segments large packets from the endpoint's interfaces 503 into a sequence of RapidIO packets and reassembles large packets for the endpoint's interfaces 503 from a sequence of RapidIO packets.

The Configuration Interface

The Configuration interface provides a connection for device configuration, statistics collection, and RapidIO network discovery. A microprocessor bus interface 517 and an I²C interface 519 are provided for handling these tasks. Interface 519 can also be used to read from PROM 521. A RapidIO Maintenance packet buffer is provided so that maintenance packets (type 8) can be generated and sent across the RapidIO network, or received by the interface.

This allows for configuration of remote RapidIO devices and for implementing the RapidIO network discovery protocol.

Maintenance Bridge 305 handles all of the RapidIO maintenance transactions that are directed to one of the Regatta endpoints, any of the ports, or the switch. These transactions all employ type 8 RapidIO packets. Configuration of CSERD 301 is handled by a controller 525, which reads and writes the registers in register map 527. Register map 527 collects the statistics registers 531, configuration registers 529, and CAR and CSR registers 533 from each RapidIO port, the endpoints and the switch. The contents and function of these registers are defined by the RapidIO standard. Also included in the registers are buffers 535 and 537 for holding RapidIO maintenance and response packets (type 8) These registers are managed by controller 525 and can be read from or written to locally by the microprocessor or $I^2C$ interface, or remotely by RapidIO maintenance packets. The actual registers specified by register map 527 are distributed throughout CSERD 301. Routing table 513 contains the routing information used to determine the destination of an incoming RapidIO packet. RapidIO maintenance packets are also used to read and write entries in routing table 513. Arbitration between maintenance bridge 305, controller 525, and interfaces 517 and 519 for access to the resources required by these entities is done by ARB 523.

Data Flows in CSERD 301

The following dataflows may occur in CSERD 301:

Endpoint 303(i) to a switch 306(i)
1) A cell or frame arriving at an endpoint is segmented if necessary and converted to a RapidIO DATA STREAMING (type 9), IMPLEMENTATION DEFINED (type 0), or MESSAGE PASSING (type 11) packet and forwarded to the endpoint's endpoint client 308.
2) Endpoint client 308 does a routing table look up and forwards the packet via internal switch 315 to serial client 309(i) which has the proper port 313(j).
3) Serial port 309(i) sends the packet via port 313(j) across the link to a remote RapidIO serial port.

RapidIO to Endpoint Interface
1) A RapidIO packet arrives at one of the serial ports 313(j) and is forwarded to serial client 309(i) to which the port belongs.
2) Serial client 309(i) does a look-up on the destination address of the packet and forwards the packet to the appropriate output client 307 and port. If the destination address matches one of the endpoint device ID's, the packet is forwarded accordingly.
3) The endpoint converts the RapidIO payload and assembles a frame if required, and forwards the cell or frame to the interface for the payload.

Between Endpoints
1) CSERD supports the transmission of encapsulated and non-encapsulated Ethernet frames to the RapidIO fabric. This allows Ethernet framing to be preserved during transmission, or to be removed and used for routing only. A bit defined in the packet stream ID is used to differentiate the traffic type.
2) If an encapsulated Ethernet frame is sent from Endpoint B and is received by the Utopia interface of Endpoint A, the framing will be removed. In this case the Ethernet payload is an ATM cell, which can then be delivered to the Utopia interface.
3) If Endpoint A interface is operating in non-Ethernet mode and sends a RapidIO packet to Endpoint B, a generic frame header and CRC are added. The values used for Ethernet framing are defined in CSERD registers.

RapidIO to RapidIO
1) A RapidIO packet of any valid type arriving at one of the serial RapidIO interface ports 313(j) goes to the port's serial client 309(i), which does a routing table look up and forwards the packet via internal switch 315 to serial client 309(j) which has the proper serial port 313(k).
2) Serial port 313(k) sends the packet across the link to another RapidIO serial port.

RapidIO Maintenance Operations
1) A RapidIO maintenance packet arrives at a serial port 313(i) and is forwarded by the serial port's serial client 309(i) via internal switch 315 and endpoint client 308 to maintenance bridge 305.
2) Maintenance bridge 305 determines whether the packet affects any aspect of CSERD 301, and if it does, maintenance bridge 305 processes the packet; otherwise, it directs the maintenance packet via endpoint client 308, internal switch 315, and serial client 309(i) to port 313(j) by which the maintenance packet can reach its destination.
3) If required, Maintenance Bridge 305 will send a maintenance response back to the originator of the request in the manner just described.
4) Maintenance transactions may also originate with devices connected to interface 517 and be sent to the Configuration Interface by way of maintenance request and response buffers 535 and 537. These buffers are mapped to the internal CSR/CAR register map.

Response Packets

When a message passing or maintenance request packet is received, a response packet is generated and sent back to the requester. The source address of the request packet is used as the destination address for the response. The client 307(i) will do a lookup on the destination address to determine the appropriate client 307(j) and port 313(k) to which to send the response packet and will send the response packet via internal switch 315 to that client 307(i), which will send the port to its destination via port 313(k).

Figure 7:
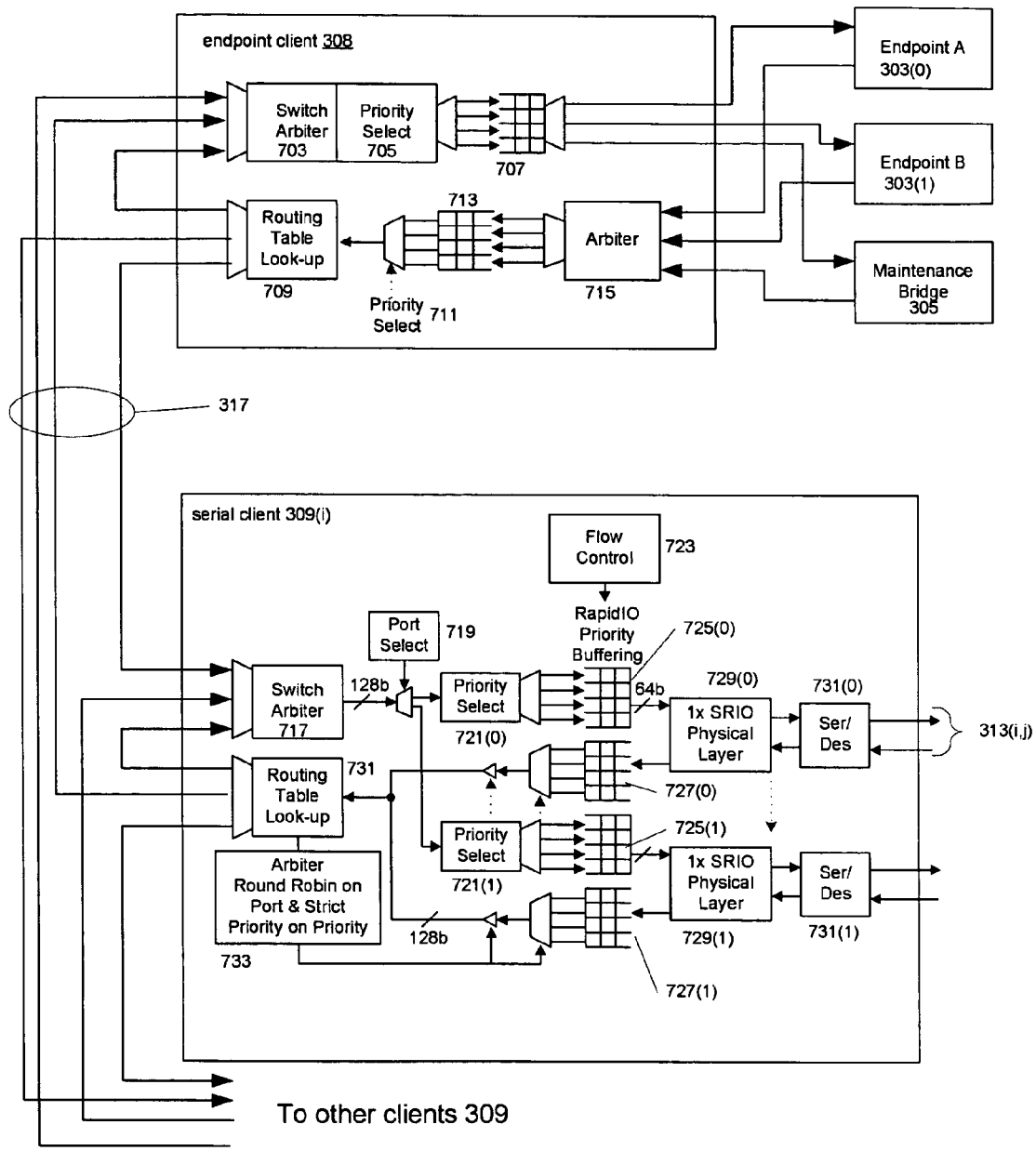
FIG. 7 is logical block diagrams of an endpoint client and a serial client.

Overview of the Internals of the Clients: FIG. 7

Clients 307 Generally

FIG. 7 presents high-level functional block diagrams of the internals of endpoint client 308 and a single serial client 309(i). Components of FIG. 7 which are from FIG. 3 have the reference numbers used in that figure. Thus, clients 308 and 309(i) are connected by poles 317 to each other and to all of the other clients in CSERD 301, endpoint client 308 is coupled to endpoints 303(0) and (2) and to maintenance bridge 305, and serial client 309 has eight bidirectional ports 313. Clients 308 and 309(i) are similar in that each moves RapidIO packets in two directions: towards internal switch 315 and away from internal switch 315. In the following, movement of data towards internal switch 315 is termed the client's ingress function and movement of data away from internal switch 315 is termed the client's egress function. The terms ingress and egress are also applied to components of the client that are used in the function, for example ingress and egress buffers, and subfunctions, such as ingress flow control and egress flow control. Functions common to all clients 307 include the following:

On ingress:
  routing a packet received in the client on a port to the proper pole for the packet's destination port;

arbitrating among packets for access to the pole via which they are routed; and as part of the arbitration function, congestion control On egress:

routing a packet received in the client on a pole to the packet's destination port; and arbitrating among the packets received on the poles for access to the ports.

Endpoint Client 308

Endpoint client 308's ingress function involves receiving RapidIO packets from either one of the endpoints 303(0) and (1) or maintenance bridge 305 and routing the packets to the poles 317 that will carry the packets to their far end clients 307. The ingress path involves arbiter 715, which arbitrates among the endpoints 303(0 and 1) and maintenance bridge 305 for access to client 308, buffer 713, in which the packets are stored until they are output to a pole, priority select 711, which selects the next packet to be output to a given pole according to a priority specified in the packet as modified by factors such as the length of time the packet has been waiting and the availability of buffer space in the far end, and routing table lookup 709, which determines the pole that is to receive the packet. As will be explained in more detail in the following, routing is done in parallel with storage in buffer 713.

When performing the egress function a client 307 is serving as a far end for itself or the other clients 307 from which the client 307 receives packets via the poles that are connected to the egress function. The egress function routes the packets received on the poles 317 to the client 307's ports. In the case of endpoint client 308, the ports are connected to an endpoint 303 or maintenance bridge 305. The egress path includes switch arbiter 703, which arbitrates among the received packets for access to endpoint client 703's ports. Arbitration is done according to the priority in the packet's PRIO field.

Serial Client 309(i)

The differences between serial client 309(i) and endpoint client 308 stem from the fact that each serial client 309 is a part of a RapidIO switch 306 with 24 bidirectional ports 313. There is an ingress path and an egress path for each port. Beginning with the ingress path, each port 313 has hardware 731 and 729 which converts the serial data received in the ports to 32-bit parallel chunks and places the chunks in buffer 727. The packet to which the chunks belong is then routed at 731 and output to the pole 317 required to take the packet to the client 307 from which it can reach its destination. Arbiter 733 arbitrates among the ports for access to the poles. Again, routing is done in parallel with buffering.

In the egress path, the data for the packets comes in 128-bit chunks from a pole 317. Switch arbiter 717 arbitrates among the packets. Port select 719 selects which of the ports 313 is to receive the data and priority select 721 places the packets in buffer 725 for port 313 according to the packets' priorities. Flow control 723 inserts flow control packets into buffer 725 where these are required to alter the rate of flow of packets being received at the port. Output is then in 64-bit chunks to hardware 729 and 731, which converts the chunks into serial packets.

Details of the Endpoint Client

Figure 8:
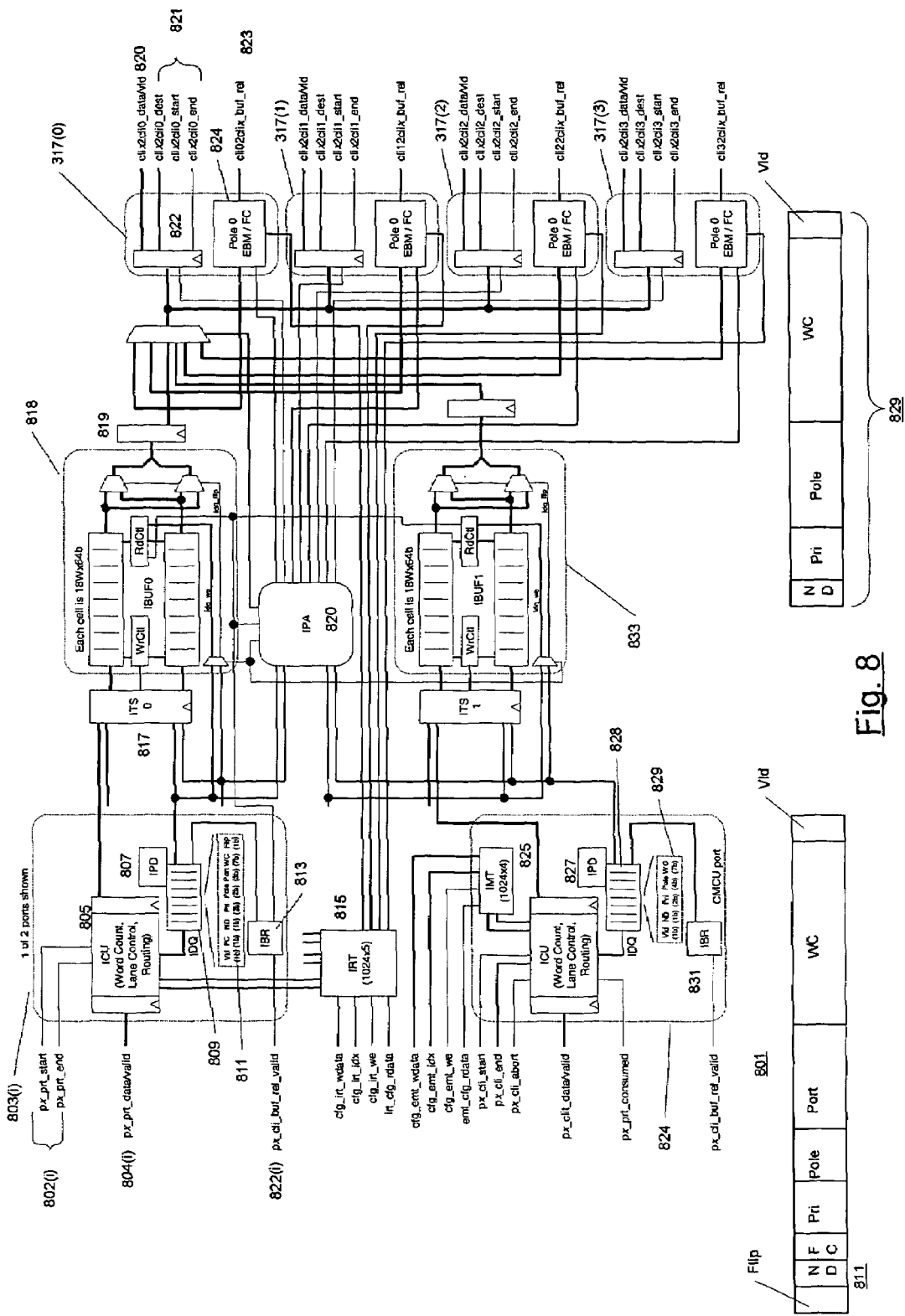
FIG. 8 is a detailed block diagram of a preferred embodiment of the ingress unit in the endpoint client.

Endpoint Client Ingress Unit: FIG. 8

FIG. 8 is a detailed block diagram 801 of a preferred embodiment of the ingress unit in the endpoint client. As already discussed, the ingress unit implements the ingress path for a RapidIO packet from endpoint A 303(0) or B 303(1) or maintenance bridge 305 to the port 317 required for the packet's destination. The end point client's ingress unit further implements multicasting in CSERD 301. In multicasting, copies of a single incoming packet are output to multiple destinations. RapidIO multicasting is defined in the RapidIO Specification and is specified by means of maintenance packets that set the appropriate CAR registers 533.

Beginning with packets from endpoints 303(0) and (1) and maintenance bridge 305, ingress unit 801 has three ports 803 to deal with these packets; one of these ports, 803(i), is shown in FIG. 8. In a preferred embodiment, there is a port 803(i) for each of the endpoints and another port for maintenance bridge 305.

The data belonging to a packet comes in at 804(i); control signals indicating the start and end of the packet are received at 802(i). When a packet 115 comes in at 804(i), ingress control unit (ICU) 805 extracts the target address field and applies it to ingress routing table (IRT) 815 to determine the pole the packet is to be output on and the port the packet is to be transmitted from after it has reached the far end client 307(i) to which the pole is connected. Ingress control unit 805 puts the pole and destination port in a descriptor 811 for the packet along with other information about the packet and writes the pole and source port to the AckID field in physical bits 119. This field has been chosen because it is not included in the computation of the packet's CRC. The packet's descriptor 811 is placed in ingress descriptor queue 809. As shown in detail at 811, the other information includes how the packet is to be read from ingress buffer 818 (Flip), whether dropping the packet is prohibited, (ND), whether receipt of the packet may result in a flow control packet being output to the packet's sender, what the packet's priority is, the word count (WC), and a valid flag for the descriptor. The determination whether the packet can be dropped is based on the packet type and configuration settings for the packet types; the priority is determined from priority bits in the packet's physical bits 119, and the word count is a count made by ICU 805 as the packet is input.

The packet itself goes via latch 817 to the port's ingress buffer 818. Ingress buffer 818 is shared by all of the ports 803 and is divided into partitions, one for each of the ports from which endpoint 308 receives packets. In a preferred embodiment, each partition is large enough to hold 32 of the largest RapidIO packets. The packet is placed in the partition belonging to the port at which the packet is received. The ingress unit treats the packets in the partition as a queue in which the packets have the same order as their descriptors in IDQ 809.

When a packet's descriptor 811 comes to the head of ingress descriptor queue 809, ingress port arbiter 820 reads the descriptor, the state of ingress descriptor queue 809, and the state of the port to which the packet is to be output to decide whether the packet can be output to the pole specified in the descriptor on this arbitration cycle. The packet is output to buffer 819 and from there to the specified pole. When the packet is output, IBR 813 generates signal 822(i) to the port physical interface indicating that a packet has been output from buffer 818. What happens to the packet on output is determined by the contents of the packet's descriptor 811. The value of the pole field determines which pole 317 the packet is output to, and the value of the port field determines the setting of the signal clix2cli0_dest in signals 821 which specifies the port to the far end client 307. If the flip bit is set, the words of the packet are rearranged on output; if ND is not set and the current condition of the port requires a drop, the packet is dropped. Ingress packet drop 807 generates the signal which causes buffer 818 to drop the packet.

When pole 317 is outputting the packet, signals 821 indicate that the data on the pole is valid, the destination port for the data, and the start and end of the packet. The packet itself is output at 820. Signal 823 indicates that the pole's far end can take data. It is input to egress buffer manager 824, which passes it on to ingress pole arbiter (IPA) 820 for use in deciding whether to output a packet to the pole. Egress buffer manager 824 also inserts flow control packets into latch 822 to control output of data from data sources to the ports of the client. These are placed on the pole that returns packets to ports in the end point client.

It is of course possible that more than one buffer 818 may be simultaneously attempting to output a packet to a pole 317. IPA 820 determines which packet will go to a pole according to the following principle: port and pri from the packet descriptor 811 for the packet are passed through Arbiter 820 to access buffer state for the far end client which is maintained in Egress Buffer Manager 824(i) handling the specified pole or poles. The sum of valid requests are separated into four priority tiers, with stalled Flow Control packet insertion having highest priority, normal Flow Control packet insertion the next, followed by stalled packets, and finally normal traffic having the lowest priority. All packets assigned to a particular priority tier are treated as equal, and a simple round-robin is done between all Ports/FC units with active requests in that tier. Note that all requests are qualified for available buffer space prior to being presented in any tier. Thus, stalled traffic cannot prevent non-stalled traffic from proceeding when stalled traffic requests cannot make progress but non-stalled traffic requests can. The mechanism for giving a transient higher priority to stalled packets will be explained in detail later.

Figure 9:
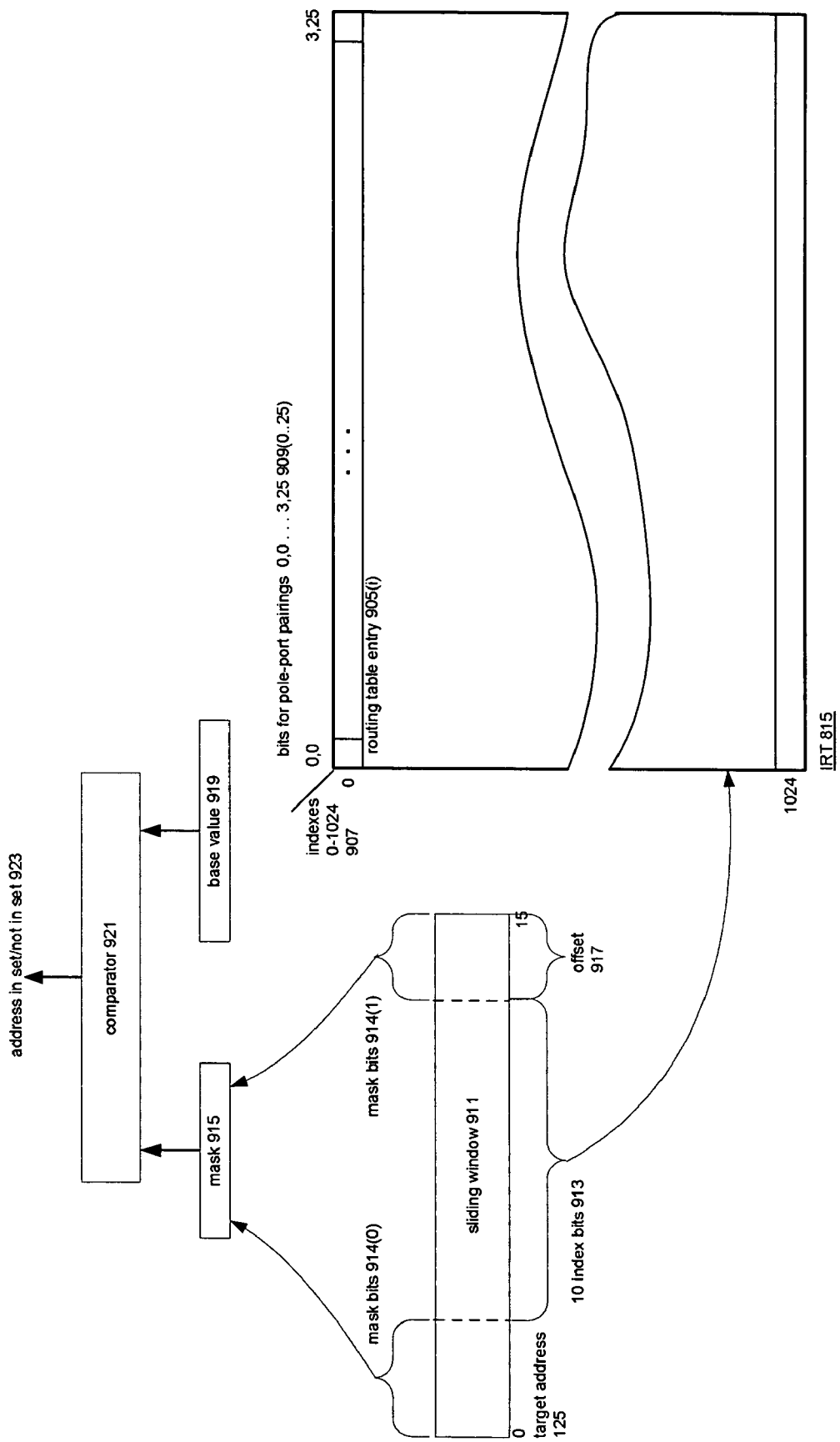
FIG. 9 is a conceptual block diagram showing the use of a sliding window in implementing a routing table.

Routing in the Ingress Unit: FIG. 9

A challenge in the design of systems for routing RapidIO packets is that target address 125 may be up to 16 bits long, which means that there are $2^{17}-1$ possible addresses that must be accounted for in the routing table. A simple routing table that had 1 entry for each possible address would have to have $2^{17}-1$ entries and would require too much die space to be economically implemented in an integrated circuit. That is particularly the case when, as in CSERD 301, the routing table is distributed and there is a local routing table like IRT 815 for each client 307. The usual solution for reducing the size of the routing table is applying a hashing function to the address to obtain a smaller index into the routing table. This solution, however, adds computational complexity and requires either a relatively large routing table or a variable number of references to the table and therefore a variable amount of time to route an address. Neither the additional computational complexity nor the tradeoff between table size and time to route an address is desirable in an integrated circuit such as CSERD 301.

FIG. 9 shows the solution 901 used to reduce the size of the routing tables associated with the clients 307 in CSERD 301. The solution limits the size of each IRT table 815 to $2^{10}$ or 1024 5-bit entries. Beginning with IRT table 815 as shown in FIG. 9, each of the 1024 entries 905 has 5 bits. The five bits specify the pole on which packets having the address corresponding to the entry are to be routed to the far end client and the port within the far end client. If target address 125 is 8 bits, the eight bits are used directly to index routing table entries 905; if target address 125 is 16 bits, a set of target addresses is defined which are routed by IRT 815. Such a set of target addresses is often termed an address space. If a target address does not belong to the address space which is routed by IRT 815, the packet is sent to a default route.

The address space which IRT 815 will route is defined by an offset 917, a mask 915, and a base value 919. Offset 917 determines the least significant bit at which a ten-bit sliding window in target address 125 begins; mask 915 masks the bits 914 that are not in sliding window 914, and base value 919 provides a predetermined value which is compared with the result of masking bits 914 to determine whether the target address belongs to the address space routed by IRT 815. If it does, IRT 815 is indexed using index bits 913 and the routing for address 125 is specified by routing table entry 905(i) corresponding to index bits 913. Otherwise, the packet is routed to a default destination. There are CSRs for offset 917, mask 915, and base value 919 for each IRT 815, and these CSRs can be set to the values required to define a particular address space via maintenance packets. It should be noted here that the technique used here for defining the address space for an IRT 815 can be used in any situation where a key is used to index a table.

Mechanism 901 can be modified to route addresses belonging to different address spaces simply by changing the value of offset 917 and/or by changing mask 915 and/or by changing the base value 919. To give a simple example, if offset 917 is set to 0 and the mask is set to 0, bits 6-15 of the target address are used to index IRT 815 and bits 0-5 of the target address are simply ignored. When arrangement 901 is set up in this fashion, the address space includes any destination address 125.

A more complicated example is the following: to set up IRT 815 so that the address space that it will route consists of all even addresses (addresses whose lsb is 0), one would set offset 917 to 1, base value 919 to 0, and the mask to 1. When this is done, bits 0-4 of the address are masked out and therefore not considered and the mask bit is set so that the value of bit 15 is compared with the value of base value 919. When the comparison is made, an address will be in the address space which can be routed by IRT 815 only if its lsb is 0, i.e., if the address is an even address. The sliding window, offset, mask, and base value 919 can be used to specify many different address spaces. For example, if a routing system is hierarchical, that is, it consists of a tree of nodes and the form of the address corresponding to a node is determined by the position of the node in the tree, arrangement 901 can be set up to route only nodes at a certain level of the hierarchy. Similarly, different setups can by used to define unicast and multicast address spaces.

Seen in broad terms, arrangement 901 includes the following: a processing unit that has access to memory in which is stored the routing table, the offset value, a base value, and address which may or may not belong to the address space defined by the offset value and the base value. The processing unit applies the offset value to the address to determine the bits of the address that are to be used to index the routing table. It then uses the non-index bits of the address and the base value to determine whether the address belongs to the address space, and if the address does belong to the address space, the processor uses the index bits to index the routing table. The technique may of course be used in any situation in which a key must be reduced to a shorter index into a table.

Figure 10:
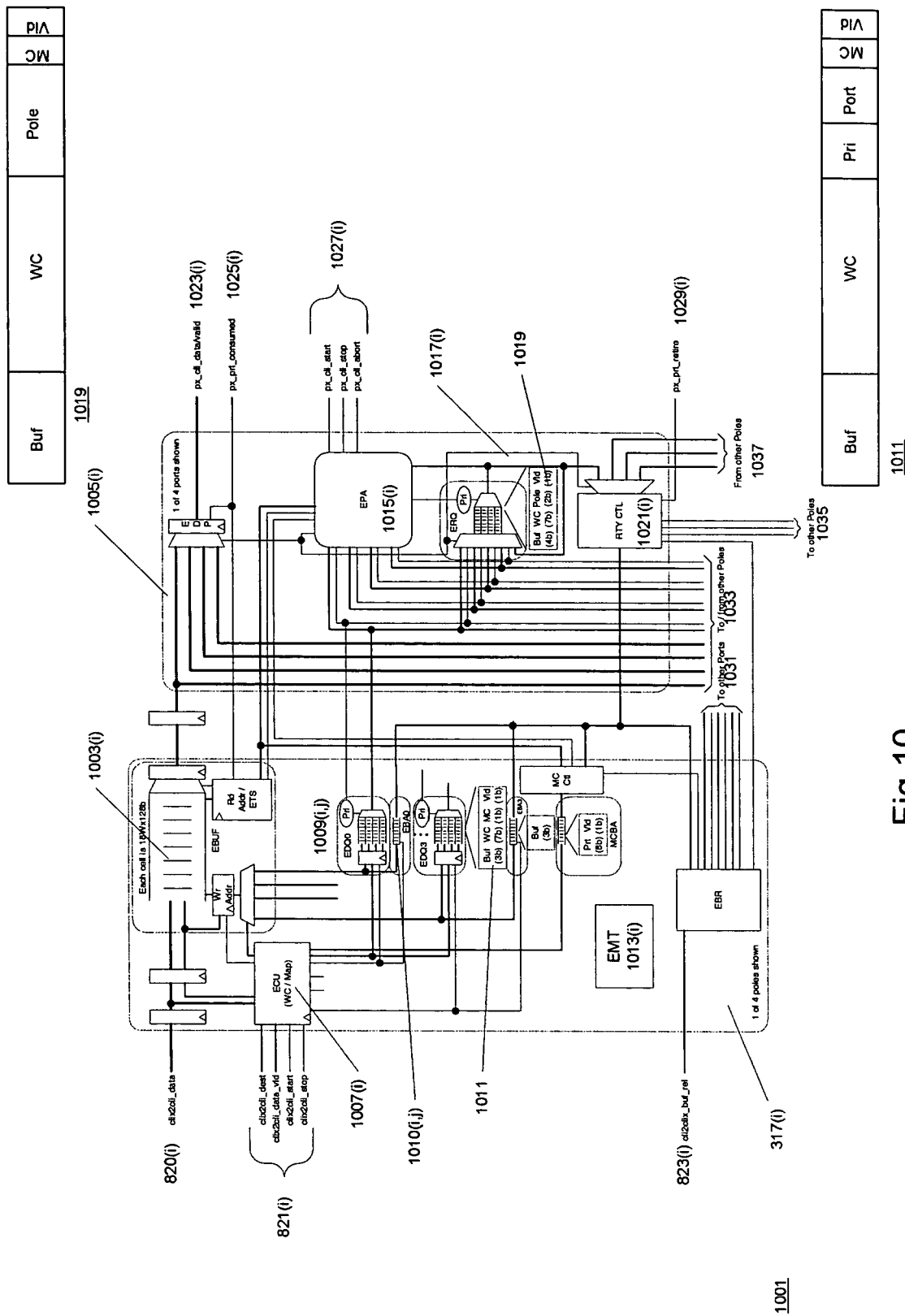
FIG. 10 is a detailed block diagram of a preferred embodiment of the egress unit in the endpoint client.

The Endpoint Client Egress Unit: FIG. 10

FIG. 10 is a detailed block diagram of endpoint client egress unit 1001, which receives packets from poles 317 and outputs them to ports 1005. In endpoint client 308, there are three ports: one for each of the endpoints 303(0) and (1) and one for maintenance bridge 301. Details for a single pole 317(*i*) and a single port 1005(*i*) are shown in the figure.

An incoming packet on pole 317(*i*) comes in at 820(*i*) and goes to egress control unit (ECU) 1007(*i*) and to egress buffer (EBUF) 1003(*i*). ECU 1007(*i*) reads the destination for the packet from signals 821(*i*) and fields from the packet to make egress packet descriptor 1011. The fields are Buf, which indicates the location in buffer 1003 of the packet, WC, the packet's word count, Pri, its priority, the port it is intended for, whether it is a multicast packet, and whether the descriptor is valid. The descriptor is stored in an egress descriptor queue (EDQ)1009(*i,j*). There are four such queues, one for each pole/port combination. Within an EDQ 1009(*i,j*), there are subqueues for each priority. The subqueues are implemented by means of bit vectors. Each bit vector has as many bits as the maximum number of descriptors EDQ 1009(*i,j*). When a packet in EBUF 103(*i*) has a particular priority, the bit corresponding to the position of the packet's descriptor in EDQ 1009(*i,j*) is set in the bit vector for the priority. Associated with each EDQ 1009(*i,j*) is an egress buffer available (EBA) queue 1010(*i,j*). When a packet whose descriptor is in EDQ 1009(*i,j*) has been successfully sent from the port, the packet's descriptor is placed in EBA queue 1010(*i,j*). When the descriptor comes to the head of EBA queue 1010(*i,j*), the storage for the packet in EBUF 1003(*i*) is made available for another packet.

Output of a packet to a port 1005(*i*) is controlled by the port's egress port arbiter (EPA) 1015(*i*), which handles the queues 1009 from one pole in strict priority order, using strict FIFO order within priority and round-robin ordering between poles with packets at the same priority. The descriptor taken from EDQ 1009(*i,j*) is the descriptor at the head of the highest-priority queue in that EDQ 1009(*i,j*). The packet that corresponds to the descriptor is then output at 1023(*i*). The descriptor 1011 for the packet moves into port 1005(*i*)'s Retry Descriptor Queue (ERQ) 1017(*i*) and given the form shown at 1019. ERQ 1017(*i*) is a single FIFO, which contain descriptors 1019 for packets in the order in which the packets were output to the port. As long as the descriptor 1019 remains in ERQ 1017(*i*), the packet remains in buffer 1003(*i*). Descriptors remain in the Retry Descriptor Queue until status for the link transfer is received via signal 1029, which indicates that the oldest descriptor 1019 in ERQ 1017(*i*) may be discarded and its buffer returned for reuse.

In response to this signal, RTY CTL 1021(*i*) reads the descriptor 1019 at the head of ERQ 1017(*i*) to obtain the source Pole for the packet represented by descriptor 1019 and the buffer number for the packet's storage in buffer 1003. RTY CTL 1021(*i*) writes the storage's number back to the source pole's EBA 1010(*i*) and activates signal 823(*i*) to the source pole so that the ingress unit at the other end of the pole knows that buffer space is available for packets from this pole in this egress unit.

Signals 1027(*i*) indicate when transmission of the packet starts, stops, or is aborted. It may happen that the recipient of a packet that has been output indicates that the packet was defective. In that case, the descriptor in ERQ 1017 is used to resend the packet. EPA 1015(*i*), ERQ 1017(*i*), and RTY CTL 1019(*i*) for the pole and the pole's EBR must all coordinate their behavior with the behavior of the corresponding components for the other three poles. This coordination is achieved by means of signals 1031, 1033, 1035, and 1037.

Multicasting Packets

RapidIO permits routing of copies of packets to multiple destinations. When a packet is to be multicast, its target address 125 specifies a multicast group ID. A list of ports is associated with the multicast group ID and the copies of the packet are output to all of the ports on the list. The multicast group IDs and the associated ports are specified in the CAR registers for a RapidIO device.

In CSERD 301, multicasting for all of the RapidIO devices is done in endpoint client 308. The routing table for each port that receives packets to be multicast is set up so that the address space which it routes includes the multicast group IDs. A packet whose target address 125 specifies a multicast group ID is routed to CMCU port 824 in endpoint client 308. CMCU port 824 generally resembles port 803(*i*), but has the following differences:

it uses ingress multicast table (IMT) 825 and egress multicast table (EMT) 1013 for routing instead of IRT 815; and the descriptor 829 for the multicast packet is lacking the Flip, FC, and Port fields.

Ingress multicast table IMT 825 and egress multicast table EMT 1013 are logically a single table. IMT 825 is located in the ingress unit of endpoint client 308. There is an EMT 1013 in the egress unit for each of the clients 307. EMT 1013 is located in the pole in the egress unit which is connected to endpoint client 308. The logical table has 1024 entries. Address space defining arrangement 901 is used to define an address space which includes all of the multicast group identifiers that will be received in the ingress unit. Each entry for a multicast group identifier specifies the pole/port combinations for the ports to which packets belonging to the multicast group are to be output. An entry in IMT 825 has four bits corresponding to the four poles; if a copy of a packet belonging to the multicast group is to be output to the pole, the bit corresponding to the pole is set. The corresponding entry in EMT 1013 for the specified pole has a bit for each port belonging to the egress unit. If the bit for the port is set, a copy of the packet is to be output to the port. Replication of a multicast packet thus happens in two stages: once in the ingress unit of endpoint client 308, where copies of the packet are made for each pole indicated in the IMT 825, and once in the far end egress unit for the pole, where copies are made for each port indicated in the EMT 1013 for the egress unit.

Multicasting works as follows in CSERD 301. The IRTs 815 for all of the ports in CSERD that receive packets that are to be multicast have entries for the multicast groups to which the packets belong. The pole-port combination for all of those IRT entries routes the packet to CMCU port 824. There, IMT 825 and EMT 1013 indicate the routing for each copy of the packet to be multicast. CMCU 824 makes copies of the packets to be multicast, makes descriptors for them, and places the packets in IBUF 833 belonging to the CMCU port and the descriptors in IDQ 828. The multicast packets are then output as described above for the packets received in port 803(*i*). To the extent permitted by congestion in CSERD 301, the packets are output to all of the poles indicated in the packet's entry in IMT 825 simultaneously.

In the far end egress units, the packet is placed in EBUF 1003(*i*) for the pole connected to endpoint client 308 and a descriptor for the packet is placed in EDQ 1009 for each port to which the multicast packet is to be output. An entry for the packet is also made in a multicast buffer available queue (MCBA) that exists for this pole's EBUF only. The entry has a bit for each of the ports; if a copy of the packet is to be output to a port, the bit for that port is set. As a copy of the packet is output from a port, the bit is cleared. When all of the bits have been cleared, the packet's storage in EBUF 1003(*i*) may be freed.

The flow of an example multicast packet which comes to endpoint client 308 and must be multicast from a number of ports in the switches 306 is as follows:

1) Packet arrives in ingress unit 801 on port 803(0).
2) Packet is placed in IBUF 818 pending Pole arbitration.
3) When granted, packet is taken from IBUF 818, and transferred across Pole 3 back to endpoint client 308.
4) Packet arrives at the endpoint client's egress unit 1001, it is stored in EBUF 1003 of Pole 3 pending space in CMCU IBUF 833.
5) When CMCU IBUF space is available, the packet is transferred across the internal CMCU port interface This datapath is 128 bits wide, but restricted to one transfer every other cycle. This allows for an increased transfer bandwidth between the Egress and Ingress buffers of the CMCU.
6) CMCU 824 determines the Poles required for replication, and arbitrates for access to all required Poles.
7) When granted, the packet is transferred from IBUF 833 to the pole for each multicast port until each pole on the multicast list has received its copy.

The following additional steps occur if the destinations for the multicast include an endpoint 303(*i*):

8) Packet arrives back at endpoint client 308, and is once more stored in the Pole 3 EBUF 1003 but in Multicast buffer space, pending Port arbitration.
9) EMT lookup is performed to determine whether endpoint 303(*i*) requires a copy. Had Port 0 originated the packet, it would be masked out of the result, resulting in a drop of the packet, and buffer release being scheduled.
10) When granted, packet is taken from the pole 3 EBUF 1003 and transferred to Port 0.

Ingress and Egress Units for Serial Clients

Figure 11:
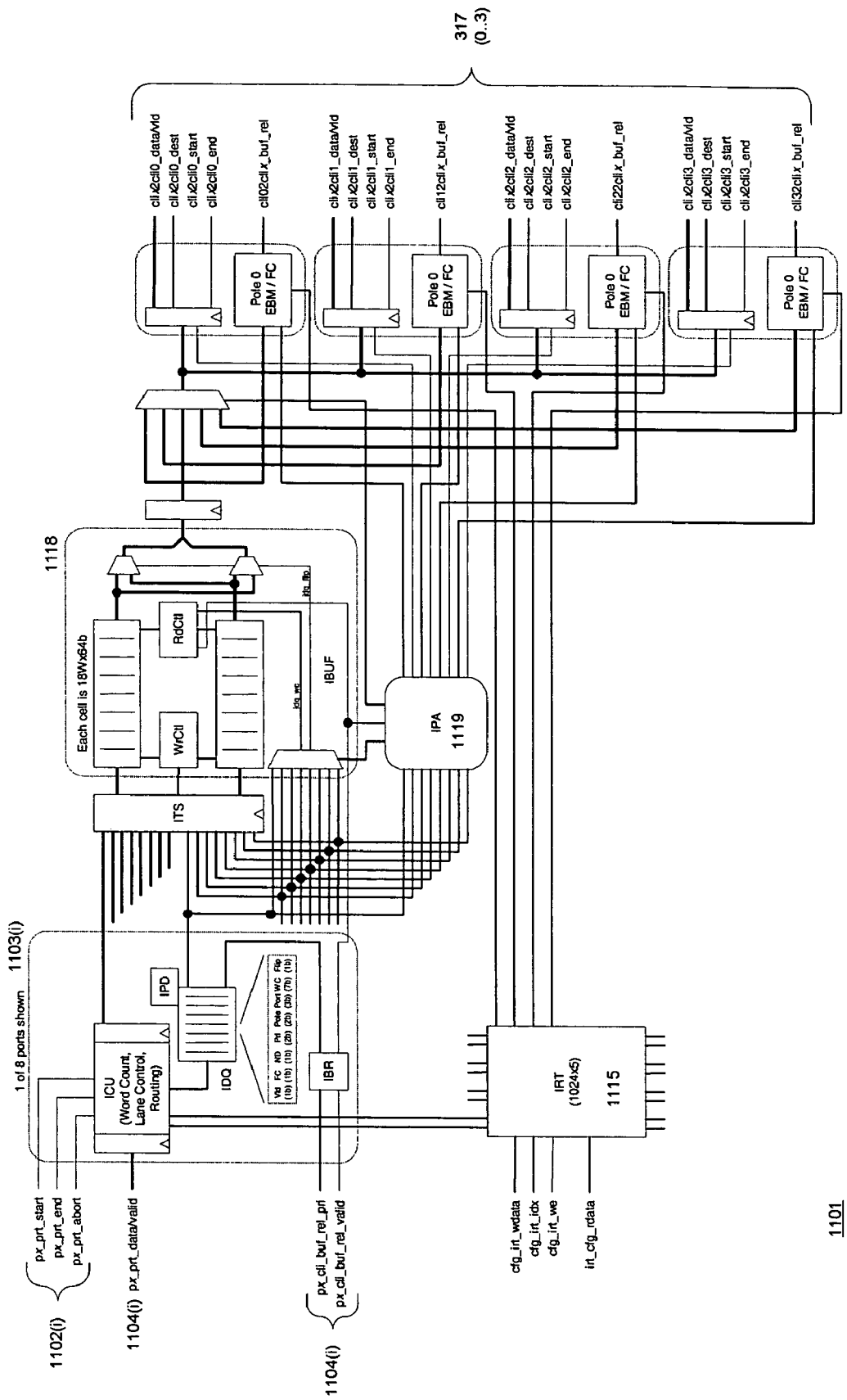
FIG. 11 is a detailed block diagram of a preferred embodiment of the ingress unit in a serial client.

The Serial Client Ingress Unit: FIG. 11

FIG. 11 is a detailed block diagram of a serial client ingress unit 1101. Shown in the block diagram is only 1 port 1103(*i*) of the 8 identical ports 1103(0 . . . 7) in unit 1101. As is immediately clear from FIG. 11, ingress unit 1101 is generally similar to ingress unit 801. The major differences are that it has 8 ports connected to bidirectional serial links, as opposed to 4 ports connected to endpoint client 308 and that there is no CMCU port 824. Operation is also similar. Packets come in at 1104(*i*), with control signals for the data on 1104(*i*) being received at 102(*i*). In the port, a descriptor is constructed for the packet and placed in the port's IDQ and the packet is placed in IBUF 1118. IBUF 1118 has a partition for each of the 8 ports. Each partition can hold 8 maximum size RapidIO packets. When the ports are ganged as two groups of four ports each, each group uses four contiguous partitions. When any of poles 317 can take data, ingress pole arbiter 1119 examines the descriptors at the heads of the descriptor queues in the ports and decides which packet is to be output to the pole that can take the data. When a packet is removed from IBUF 1118, signals 1104(*i*) indicate the availability of space in IBUF 1118 to the hardware that is receiving the packets from the serial links.

Figure 12:
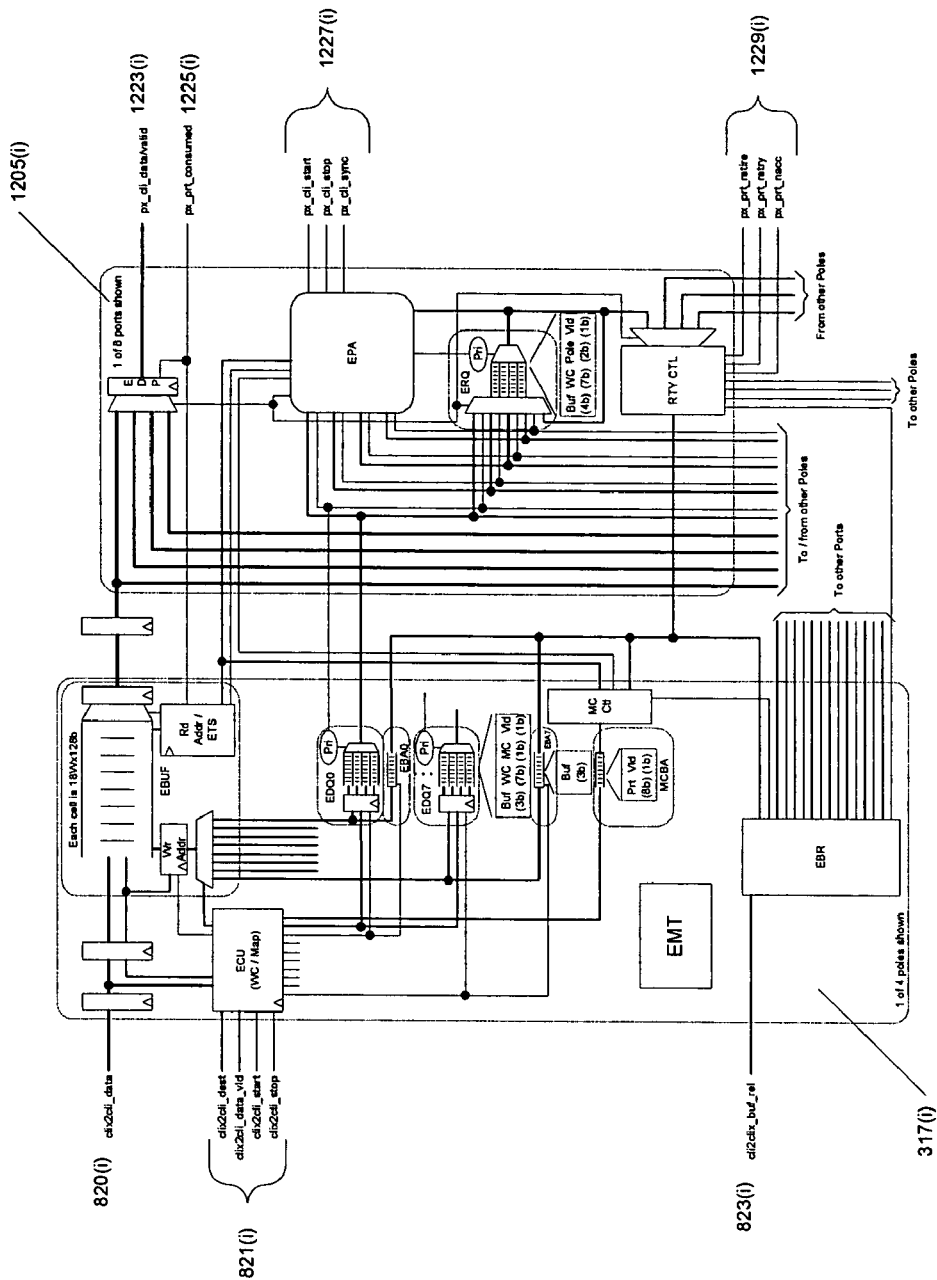
FIG. 12 is a detailed block diagram of a preferred embodiment of the egress unit in a serial client.

The Serial Client Egress Unit: FIG. 12

FIG. 12 is a detailed block diagram of serial client egress unit 1201. The only difference between it and endpoint egress unit 1001 is that serial egress unit 1201 has 8 ports instead of 4 and these ports are to serial input/output links. The differences resulting from this fact are reflected in signals 1227(*i*) and 1220(*i*).

Figure 13:
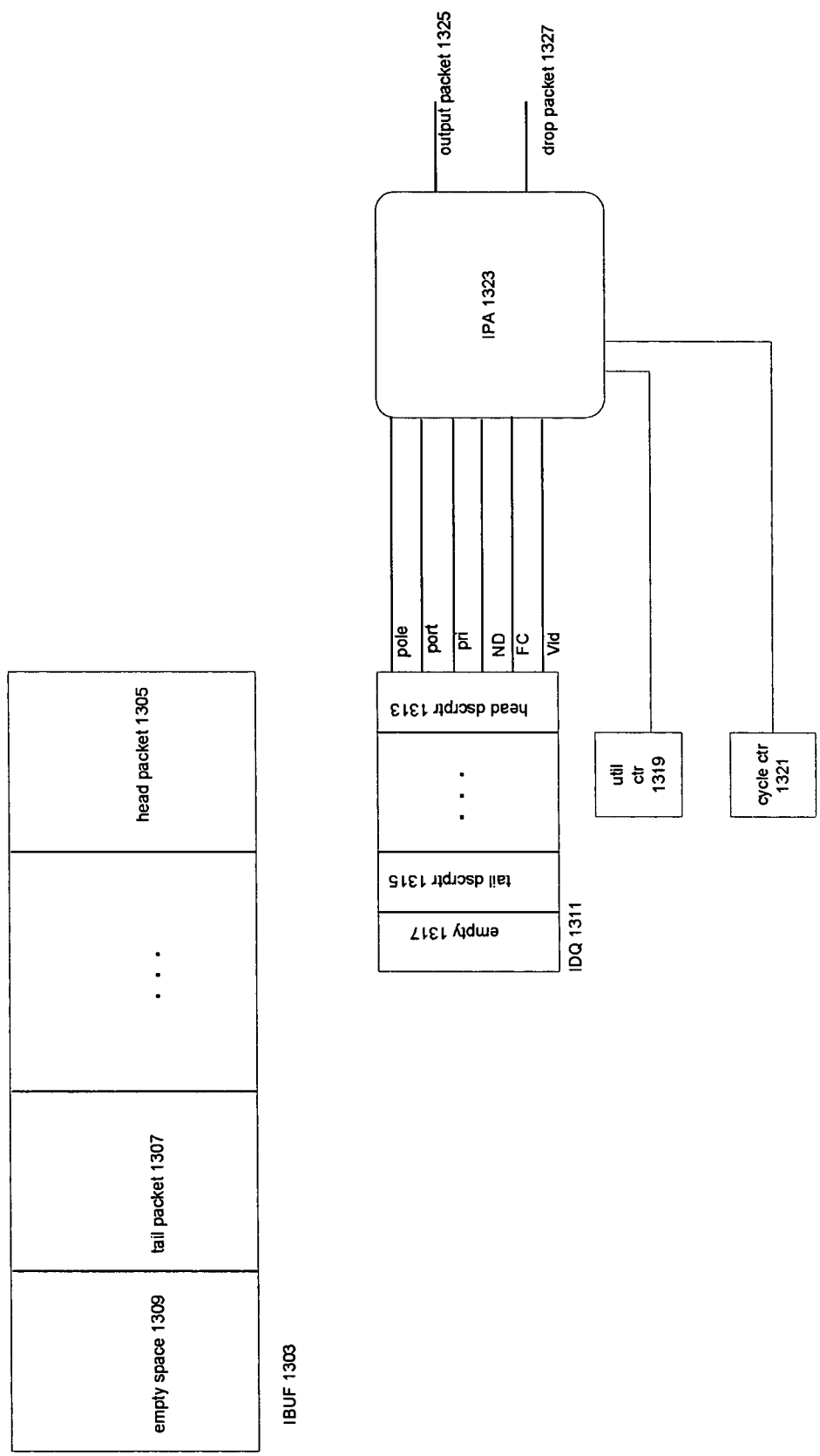
FIG. 13 is a block diagram of apparatus for performing stalled packet arbitration in a preferred embodiment.

Congestion Control: FIG. 13

Congestion Control Generally in RapidIO

RapidIO controls congestion by means of flow control and packet priorities. The RapidIO standard provides for flow control both between RapidIO switches and between RapidIO end points. The mechanism employed is RapidIO flow control packets. There are two kinds of flow control packets: one that specifies that the source stop sending packets and another that the source resume sending packets. RapidIO switch devices may send flow control packets but are never the destinations for such packets. As may be seen from the use of flow control packets, the basic RapidIO model is that a packet source assumes that the RapidIO network can take a packet unless the source has received a flow control packet that indicates the contrary. As was mentioned in the discussion of endpoint client ingress unit 801, when the state of EBUF 1003 for a pole of a client 307(*i*) indicates that a flow control packet directed to the source of data for the port is necessary, IPA 820 causes Egress Buffer Manager 824 to make the flow control packet for the port and place it on the pole that returns the packet to client 307(*i*) for output by the client's egress unit.

The foregoing presumes of course that EBUF 1003 in client 307(*i*) is able to accept the flow control packet. If it cannot because a port has ceased functioning, this will eventually be detected and a maintenance packet will be sent to deal with the problem. This packet will go to maintenance bridge 305, not to the client 307(*i*) with the broken port, and maintenance bridge 305 can directly cause client 307(*i*) to drop the packets in EBUF 1003 that are intended for the port.

As previously mentioned, there are two priority bits in the physical bits 119, allowing for priority levels from 0 through 3, with 3 being the highest. The user can assign priorities to packets arbitrarily; typically, priority 0 is for ordinary data plane packets; priority 1 is for high priority data plane packets; priority 2 is for control plane packets; priority 3, finally, is for flow control packets and response packets.

Flow Control Between Clients 307 of CSERD 301

Flow control across the poles of CSERD 301 is provided by buffer release signal 823 for the pole. The signal goes to the ingress unit at the other end of the pole and indicates that a packet has been sent from the pole's egress buffer 1003. The signal is received in the egress buffer manager 824 of the ingress unit at the other end of the pole and passed on to the ingress unit's IPA 820. IPA 820 will not send a packet via the pole unless the signal indicates that the egress unit at the other end of the pole has room for the packet.

Dealing with Stalled Packets in CSERD 301

A packet is stalled in CSERD 301 when it is at the head of the IBUF for the port at which the packet entered CSERD 301 and remains there. A packet will stall if other packets with which the stalled packet is contending for access to the pole have higher priorities and are therefore given precedence over the stalled packet for output to the pole. Of course, if a packet remains stalled for any length of time, the IBUF for the port fills up and the EBM 824 issues a flow control packet to the port.

A preferred embodiment of CSERD 301 deals with stalled packets by permitting IPA 820 in a client 307(*i*) to treat the stalled packet as though it had a higher priority than the priority indicated by its priority bits and if that doesn't end the stall, to drop packets whose descriptors indicate that they may be dropped. FIG. 13 shows how this is done. Stalled packet arbitration apparatus is shown at 1301. Components include an ingress buffer (IBUF) 1303 for a port, the ingress descriptor queue (IDQ) 1311 for the port, counters 1319 and 1321 which keep track of the state of IDQ 1311, and ingress pole arbiter 1323. IBUF 1303 has a queue of packets including head packet 1305 and tail packet 1307 and empty space 1309. IDQ 1311 has a descriptor for each of these packets, including head descriptor 1313 for head packet 1305 and tail descriptor 1315, followed by empty space 1317. The descriptors have the same order in IDQ 1311 as the packets have in IBUF 1303. The stalled packet is head packet 1305 and is represented by head descriptor 1313. Associated with IDQ 1311 are two counters. util counter 1319 keeps track of the extent of utilization of IBUF 1303; every time a packet is added to IBUF 1303 and a descriptor to IDQ 1311, util counter 1319 is incremented; every time a packet is removed, util counter 1319 is incremented. The current value of util counter 1319 thus represents the number of packets currently in IBUF 1303. Cycle counter 1321 keeps track of the number of arbitration cycles for which head descriptor 1313 has been at the head of IDQ 1311, and thus of the number of arbitration cycles for which head packet 1305 has been at the head of IBUF 1303.

The values of the counters and of the pole, port, pri, ND, FC, and vld fields of head descriptor 1313 are output to IPA 1323, which is also aware of whether the port to which the packet is being directed (specified in the port field of the descriptor) is accepting data. When IPA finds that a packet can be output, it so indicates on output packet signal 1325 for IBUF 1303; if it finds that a packet must be dropped, it so indicates on drop packet signal 1327. There are two cases:

1. The port the packet is being directed to is accepting data. In this case, when the number of cycles indicated by cycle counter 1321 exceeds a threshold, the packet receives stalled packet arbitration. The threshold varies with the degree of utilization of IBUF 1303 that is indicated by utilization counter 1319. As the degree of utilization increases, the number of cycles required for stalled packet arbitration decreases. In stalled packet arbitration, round-robin arbitration occurs among all packets receiving stalled packet arbitration (up to 8 simultaneously) and only Flow Control packets have priority over them. All packets which are in stalled packet arbitration and which can be output to a pole must be output before packets being normally arbitrated will be considered. While the packet is in stalled packet arbitration, the cycle counter for the IDQ 1311 to which its descriptor belongs is decremented.

2. The port the packet is being directed to is not accepting data and the ND field in the packet's descriptor 1313 indicates that the packet may be dropped. In this case, cycle counter 1321 counts cycles as before and the threshold again varies with the degree of utilization of IBUF 1303. When the number of cycles indicated by cycle counter 1321 exceeds the threshold, the packet is dropped. If the port begins accepting data before the threshold is reached, the packet enters stalled packet arbitration as described above.

Stalled packet arbitration can be broadly characterized as employing the following method: a threshold time is established for determining whether a particular packet is stalled. In establishing the threshold time, the amount of space remaining in the buffer containing the stalled packet may be taken into account. When the threshold time is exceeded, the arbiter responds by treating the particular packet during arbitration as if the particular packet had a higher priority. Advantages of stalled packet arbitration include the following:

The priority of the packet as indicated by its pri bits is not affected;

a low priority packet at the head of a queue cannot indefinitely block higher-priority packets that are behind it in the queue;

low-priority traffic that has been stalled is allowed to progress, thereby avoiding starvation in the sink for which it is destined;

packets are allowed to progress instead of being dropped.

Stalled packet arbitration may be employed in any situation where a number of packets are contending for access to a resource.

Details of Configuration Interface 515

A feature of the RapidIO architecture is the use of Capability Registers (CARs) and Control/Status Registers (CSRs). The CARs are read only registers which make the characteristics of a RapidIO device available to software which uses the device. The CSRs are writable registers which software may use to configure the device and determine the device's configuration. As shown at 533 in FIG. 5, the CARs and CSRs for all of the endpoints and ports in CSERD 301 are contained in configuration interface 515, rather than in the clients 307. CARs and CSRs 533 may be set and read in two ways: by means of maintenance packets directed to one of the endpoints 303 and by using a processor connected to interface 517 to read and write register map 527 directly. Endpoint client 308 does not send maintenance packets (type 8) directed to an endpoint 303 to the endpoint, but instead sends them via maintenance bridge 305 to configuration interface 515.

Addressing an Endpoint in a RapidIO Device with Multiple Endpoints

While placing all of the CARs and CSRs in configuration interface 515 is advantageous in its own right both because it makes centralized control of the registers easier and because it simplifies the design of the clients 307, it also solves a problem which the RapidIO architecture poses for CSERD 301, namely that the architecture provides for only a single address for a RapidIO device, and consequently permits only one addressable component in a RapidIO device. CSERD 301, however, has two such addressable components, namely endpoints 303. To solve this problem, CSERD 301 has a mechanism which permits CSERD 301 to have more than one address and thus to have more than one addressable component.

Addressing in the RapidIO Architecture: FIG. 14

FIG. 14 provides an overview at 1401 of the CARs and CSRs provided by the architecture. These can be divided into three categories: CARs and CSRs 1403 for the entire device, CARs and CSRs for non-switch components 1408, and CARs and CSRs for ports 1411.

The CARs and CSRs of interest in the present discussion are device CARs and CSRs 1403. Included in CARs and CSRs 1403 are processing element features CAR 1405, which defines the kinds of components the device contains, switch port information CAR 1407, which indicates the total number of ports in the device, and base device ID CSR 1407, which specifies the device's ID in the RapidIO network to which the device belongs. There may be only one base device ID CSR 1408 in device CARs and CSRs 1403. To illustrate the problem posed by the architecture, FIG. 14 presents a detail of processing element features CAR 1405.

As may be seen there, each kind of component that may be contained in a RapidIO device is represented by a single bit, leaving no way to indicate how many of a given kind of component are present.

Figure 15:
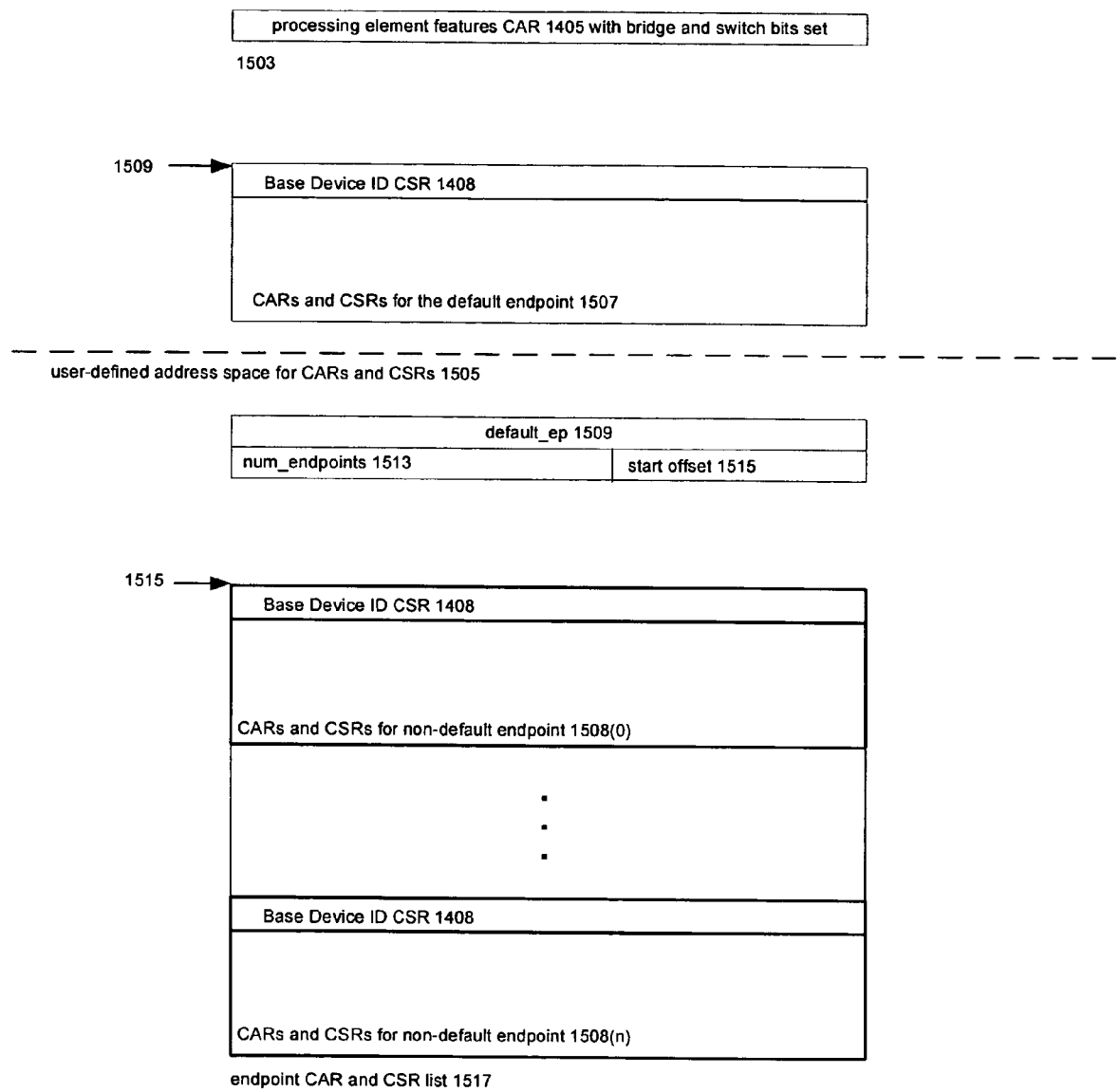
FIG. 15 shows how the RapidIO architecture has been extended to provide for more than one endpoint in a RapidIO device.

Extending RapidIO to Provide for More than One Endpoint in a RapidIO Device: FIG. 15

The challenge in extending the Rapid IO architecture to provide for more than one endpoint in a RapidIO device is to do so in such a manner that the device will continue to work with other RapidIO devices which adhere strictly to the standard and thus have no notion of a RapidIO device that has more than one base device ID. FIG. 15 shows how the architecture is extended in CSERD 301.

As shown in FIG. 15, the RapidIO architecture provides for a system-defined address space 1501 for CARs and CSRs; it also provides for a user-defined address space 1505 for user-defined CARs and CSRs that are not part of the standard architecture. In the extension, system-defined address space 1503 includes a processing element features CAR 1405 in which the bits for both a bridge device and a switch device are set. It also includes the CARs and CSRs for one of the endpoints 303 at the architecturally-defined locations fur such CARs and CSRs. The endpoint 303 is termed the default endpoint. Because the default endpoint 303(i)'s CARs and CSRs are at the expected architectural location, a CSERD 301 will work with another RapidIO device that has no notion that CSERD 301 has two endpoints.

The information needed by another RapidIO device that is aware that CSERD 301 may have more than one endpoint is in user-defined address space 1505. User-defined address space 1505 contains an endpoint CAR and CSR list 1517 which contains copies 1508(0 . . . n) of the CARs and CSRs for each of the non-default endpoints. It further contains two registers: default_ep 1509 and num_endpoints 1513. If default_ep is null, the only endpoint is the default endpoint. If it is non-null, it includes a pointer to the default endpoint. The remaining endpoints are located using num_endpoints register 1513, which specifies the number of endpoints in the device and the offset 1515 of the start of endpoint CAR and CSR list 1517.

The arrangements of FIG. 15 are used to process RapidIO maintenance packets (type 8). One function of these packets is to permit the RapidIO devices in a RapidIO network to discover the configuration of the network; another function of these packets is to specify operations to be performed on the CARs and CSRs for the devices in the network. With the CARs, the operations are limited to reading the CARs; with the CSRs, the operations also include reading and writing the CSRs. In all cases, when a maintenance packet arrives at maintenance bridge 305, maintenance bridge 305 reads the packet's target address field 125; then maintenance bridge 305 reads default_ep register 1509; if it is null, indicating that there is only a single endpoint, maintenance bridge 305 compares the address it has read with the value in Base Device ID CSR 1408. If the two match, the configuration interface performs the operation specified in the maintenance packet; if they do not, the configuration interface does not service the packet If default_ep register 1509 is not null, maintenance bridge 305 compares the address it has read from the maintenance packet with the base device ID CSR 1408 in CARs and CSRs 1507 for the default endpoint and CARs and CSRs 1508 in list 1517 until it finds a match; when the match is found, the configuration interface performs the specified operation; if no match is found, the configuration interface does not service the packet.

Apparatus that employs the foregoing technique can be broadly characterized as follows: the apparatus has a first user-defined configuration register that indicates whether the network device has only an architectural address that is prescribed by the network's architecture and second user-defined configuration registers that contain the addresses of additional devices. When the first configuration register indicates that the device has only an architectural address, the device compares an address received in the device with the architectural address; when the first configuration register indicates that the device has additional addresses, the device compares the received address to the architectural address, and if the received address does not match the architectural address, to one or more of the additional addresses.

CONCLUSION

The foregoing Detailed description has disclosed to those skilled in the relevant technologies how to make and use an integrated circuit which combines a number of RapidIO devices, and has further disclosed the best mode presently known to the inventors of making the circuit. It will be immediately apparent to those skilled in the relevant technologies that the techniques disclosed in the Detailed Description may be employed not only to make integrated circuits that combine Rapid IO devices, but for devices used in packet networks generally, whether or not implemented in integrated circuits and whether or not the network conforms to the RapidIO architecture. In particular, the use of poles to connect the input and output sides of multiported devices, the congestion avoidance techniques, the multicasting techniques, and the techniques for dealing with devices that have more than one address may be employed where the devices involved are not implemented in a single integrated circuit, and the techniques for defining an address space for a lookup table may be used in any circumstance where a large key has to be reduced to a smaller index. Details of the implementations described herein are of course necessarily affected by the fact that the implementation is implementing the RapidIO standard and are also affected by the exigencies of implementing such a complex device in an integrated circuit.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A network device that operates in a network whose architecture permits only a single architectural address to be specified for the network device, the architecture further specifying configuration information including user-defined configuration information for the network device and the network device being characterized by memory containing:

first user-defined configuration information that indicates whether the network device has only the architectural address; and second user-defined configuration information specifying a set of additional addresses to which the network device responds, the network device responding to an address received in the device when the first user-defined configuration information indicates that the device has only the architectural address by comparing the received address to the architectural address and if the received address matches the architectural address, further responding thereto and responding to the received address when the first user-defined configuration information indicates that the device has the set of additional addresses by comparing the received address to the architectural address and if the received address matches the architectural address, further responding thereto and otherwise comparing the received address to the additional addresses in the set and if the received address matches one of the additional addresses, further responding thereto.

2. The network device set forth in claim 1 further characterized in that:

the network device has a plurality of addressable components; and the architectural address and the additional addresses are addresses of the addressable components.

3. The network device set forth in claim 2 further characterized in that:

each of the addressable components has a set of configuration information;

the address of the addressable component is in the set of configuration information for the addressable component; and the second user-defined configuration information contains the sets of configuration information for the addressable components having the additional addresses.

4. The network device set forth in claim 2 further characterized in that:

the network device is implemented in an integrated circuit.

5. The network device set forth in claim 2 further characterized by:

a configuration manager that is separate from the addressable components and manages the configuration information for all of the components.

6. The network device set forth in claim 5 further characterized in that:

the network's architecture defines maintenance packets that contain device addresses; and the configuration manager receives a maintenance packet received in the device and uses the first and second user-defined configuration information to determine whether the maintenance packet is directed to one of the component devices.

7. The network device set forth in claim 1 further characterized by:

third user-defined configuration information contained in the memory that when the first user-defined configuration information indicates that the device has additional addresses in addition to the architectural address, indicates a number of addresses; and the device uses the number of addresses indicated in the third user-defined configuration information to determine a maximum number of addresses to compare with the received address.

8. The network device set forth in claim 7 further characterized in that:

when the first user-defined configuration information indicates that the device has additional addresses, the first user-defined information further indicates the architectural address's location.

9. The network device set forth in claim 7 further characterized in that:

the third user-defined configuration information further indicates a location of the second user-defined configuration information.

10. The network device set forth in claim 9 further characterized in that:

when the first user-defined configuration information indicates that the device has additional addresses, the first user-defined configuration information further indicates the architectural address's location.

11. The network device set forth in claim 9 further characterized in that:

the second user-defined configuration information is contained in an array thereof; and the location indicated in the third user-defined configuration information is the location of the array.

12. A method used in a network device that operates in a network whose architecture permits the network device to have only a single architectural address to cause the device to respond to one or more additional addresses in addition to the architectural address for the device, the architecture further having configuration information including user-defined configuration information and the method comprising the steps of:

if there are additional addresses, including the additional addresses in first user-defined configuration information;

setting second user-defined configuration information to indicate whether the device has only the architectural address or the additional addresses; and on receipt of an address in the network, responding to the received address by performing steps including if the second user-defined configuration information indicates that the device has only the architectural address, comparing the received address to the architectural address and further responding thereto if there is a match; and if the second user-defined configuration information indicates that the device has the additional addresses and the received address does not match the architectural address, comparing the received address to the additional addresses and further responding thereto if a match is found.

13. The method set forth in claim 12 wherein:

the network device has a plurality of addressable components; and the architectural address and the additional addresses are addresses of the addressable components.

14. The method set forth in claim 13 wherein:

each of the addressable components has a set of configuration information that includes the component's address; and in the step of including the additional addresses, the set of configuration information for the component is included.

15. The method set forth in claim 12 wherein:

in the step of setting second user-defined configuration information, when the second user-defined configuration information indicates that the device has additional addresses, the second user-defined configuration information is further set to indicate the location of the architectural address.

16. The method set forth in claim 15 further comprising the step of:

setting third user-defined configuration information to indicate the number of additional addresses when the second user-defined configuration information indicates that the device has one or more additional addresses; and in the step of comparing the received address to the additional addresses, making the comparison with the number of additional addresses specified in the third user-defined configuration information.

17. The method set forth in claim 16 further comprising the step of:

setting the third user-defined configuration information to further indicate a location of the first user-defined configuration information; and in the step of comparing the received address to the additional addresses, using the location in the third user-defined configuration information to locate the additional addresses.

18. The method set forth in claim 12 further comprising the step of:

setting third user-defined configuration information to indicate the number of additional addresses when the second user-defined configuration information indicates that the device has one or more additional addresses; and in the step of comparing the received address to the additional addresses, making the comparison with the number of additional addresses specified in the third user-defined configuration information.

19. The method set forth in claim 12 further comprising the step of:

setting third user-defined configuration information to indicate a location of the first user-defined configuration information; and in the step of comparing the received address to the additional addresses, using the location in the third user-defined configuration information to locate the additional addresses.

* * * * *